(12) United States Patent
Horn et al.

(10) Patent No.: US 11,637,731 B2
(45) Date of Patent: Apr. 25, 2023

(54) JOINT RATE MATCHING AND PUNCTURING FOR CHANNEL ORIENTED TONE RESERVATION

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/353,318

(22) Filed: Jun. 21, 2021

(65) Prior Publication Data

US 2022/0407762 A1    Dec. 22, 2022

(51) Int. Cl.
| | |
|---|---|
| *H04W 24/10* | (2009.01) |
| *H04L 27/26* | (2006.01) |
| *H04L 1/00* | (2006.01) |

(52) U.S. Cl.
CPC ........ *H04L 27/2618* (2013.01); *H04L 1/0068* (2013.01); *H04W 24/10* (2013.01)

(58) Field of Classification Search
CPC ... H04L 27/2618; H04L 1/0068; H04W 24/10
See application file for complete search history.

(56) References Cited

U.S. PATENT DOCUMENTS

| | | | | |
|---|---|---|---|---|
| 2008/0298490 | A1* | 12/2008 | Yun ....................... | H04L 5/0048 375/260 |
| 2015/0296518 | A1* | 10/2015 | Yi ..................... | H04W 72/0473 370/336 |

* cited by examiner

*Primary Examiner* — Chuong A Ngo
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication that tone reservation is to be applied, to a subsequent communication, including applying rate matching on a first set of tone reservation (TR) subcarriers and applying puncturing on a second set of the TR subcarriers. The UE may receive the subsequent communication based at least in part on rate matching being applied to the first set of the TR subcarriers and puncturing being applied to the second set of the TR subcarriers. Numerous other aspects are described.

30 Claims, 13 Drawing Sheets

700 →
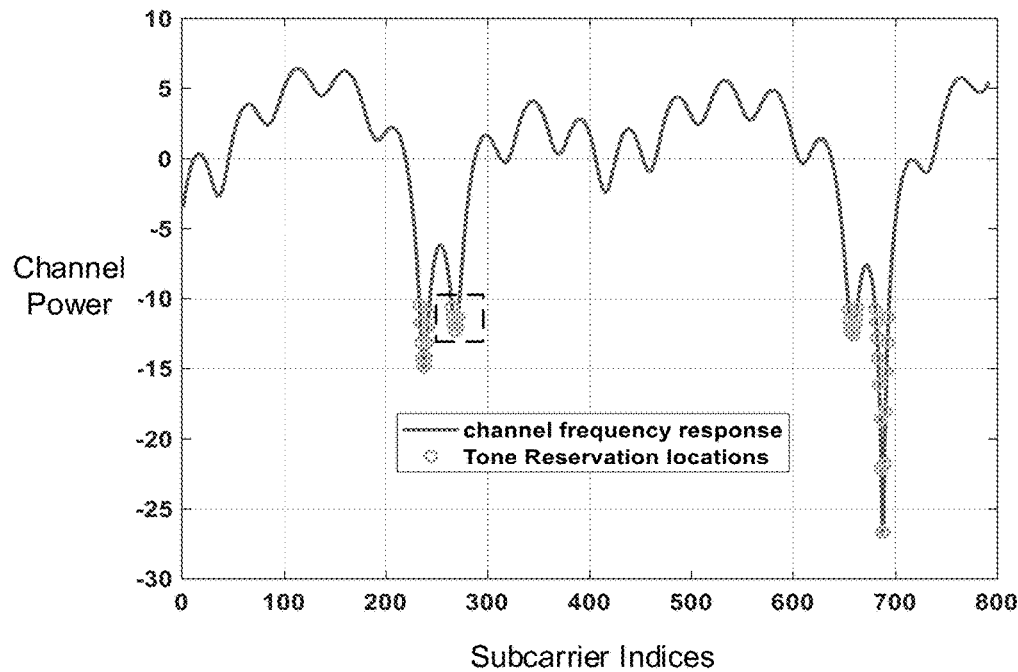
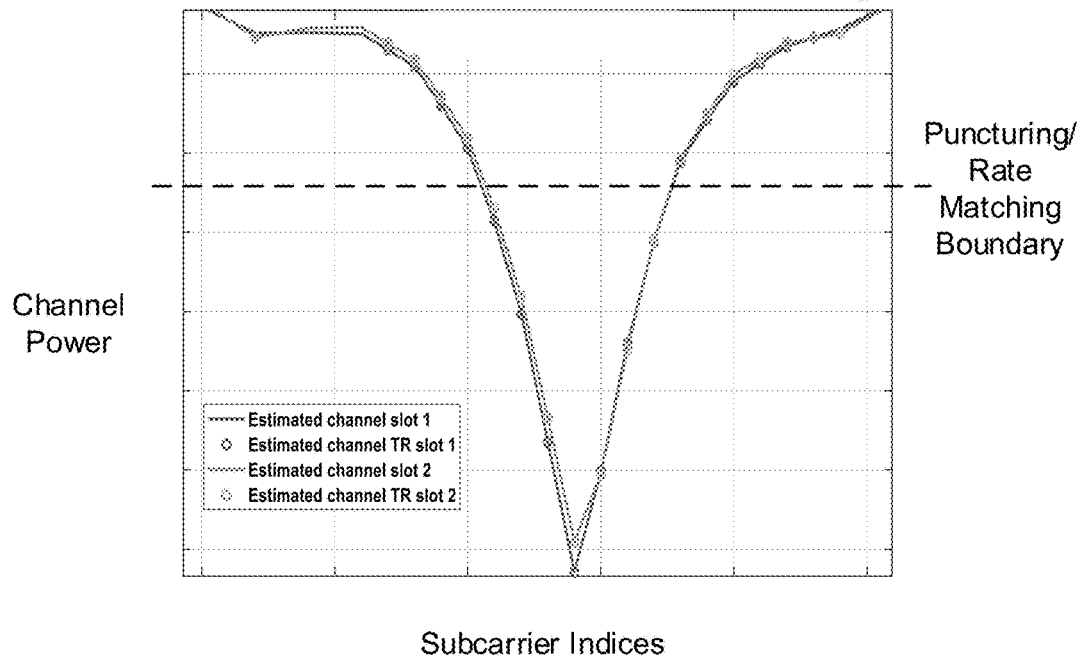
FIG. 7

JOINT RATE MATCHING AND PUNCTURING FOR CHANNEL ORIENTED TONE RESERVATION

FIELD OF THE DISCLOSURE

Aspects of the present disclosure generally relate to wireless communication and to techniques and apparatuses for joint rate matching and puncturing for channel oriented tone reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication that tone reservation is to be applied, to a subsequent communication, including applying rate matching on a first set of tone reservation (TR) subcarriers and applying puncturing on a second set of the TR subcarriers; and receiving the subsequent communication based at least in part on rate matching being applied to the first set of the TR subcarriers and puncturing being applied to the second set of the TR subcarriers.

In some aspects, a method of wireless communication performed by a base station includes transmitting an indication that tone reservation is to be applied, to a subsequent communication, including applying rate matching on a first set of TR subcarriers and applying puncturing on a second set of the TR subcarriers; and transmitting the subsequent communication based at least in part on rate matching being applied to the first set of the TR subcarriers and puncturing being applied to the second set of the TR subcarriers.

In some aspects, a method of wireless communication performed by a UE includes receiving an indication that tone reservation is to be applied, to a subsequent communication, including applying rate matching on a first set of TR subcarriers and applying puncturing on a second set of the TR subcarriers; and transmitting the subsequent communication based at least in part on rate matching being applied to the first set of the TR subcarriers and puncturing being applied to the second set of the TR subcarriers.

In some aspects, a method of wireless communication performed by a base station includes transmitting an indication that tone reservation is to be applied, to a subsequent communication, including applying rate matching on a first set of TR subcarriers and applying puncturing on a second set of the TR subcarriers; and receiving the subsequent communication based at least in part on rate matching being applied to the first set of the TR subcarriers and puncturing being applied to the second set of the TR subcarriers.

In some aspects, a UE for wireless communication includes a memory; and one or more processors, coupled to the memory, configured to: receive an indication that tone reservation is to be applied, to a subsequent communication, including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers.

In some aspects, a base station for wireless communication includes a memory; and one or more processors, coupled to the memory, configured to: transmit an indication that tone reservation is to be applied, to a subsequent communication, including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers.

In some aspects, a UE for wireless communication includes a memory; and one or more processors, coupled to the memory, configured to: receive an indication that tone reservation is to be applied, to a subsequent communication, including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers.

In some aspects, a base station for wireless communication includes a memory; and one or more processors, coupled to the memory, configured to: transmit an indication that tone reservation is to be applied, to a subsequent communication, including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers.

In some aspects, a non-transitory computer-readable medium stores a set of instructions for wireless communication includes one or more instructions that, when executed by one or more processors of a UE, cause the UE to: receive an indication that tone reservation is to be applied, to a subsequent communication, including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers.

In some aspects, a non-transitory computer-readable medium stores a set of instructions for wireless communication includes one or more instructions that, when executed by one or more processors of a base station, cause the base station to: transmit an indication that tone reservation is to be applied, to a subsequent communication, including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers.

In some aspects, a non-transitory computer-readable medium stores a set of instructions for wireless communication includes one or more instructions that, when executed by one or more processors of a UE, cause the UE to: receive an indication that tone reservation is to be applied, to a subsequent communication, including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers.

In some aspects, a non-transitory computer-readable medium stores a set of instructions for wireless communication includes one or more instructions that, when executed by one or more processors of a base station, cause the base station to: transmit an indication that tone reservation is to be applied, to a subsequent communication, including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers.

In some aspects, an apparatus for wireless communication includes means for receiving an indication that tone reservation is to be applied, to a subsequent communication, including applying rate matching on a first set of TR subcarriers and applying puncturing on a second set of the TR subcarriers; and means for receiving the subsequent communication based at least in part on rate matching being applied to the first set of the TR subcarriers and puncturing being applied to the second set of the TR subcarriers.

In some aspects, an apparatus for wireless communication includes means for transmitting an indication that tone reservation is to be applied, to a subsequent communication, including applying rate matching on a first set of TR subcarriers and applying puncturing on a second set of the TR subcarriers; and means for transmitting the subsequent communication based at least in part on rate matching being applied to the first set of the TR subcarriers and puncturing being applied to the second set of the TR subcarriers.

In some aspects, an apparatus for wireless communication includes means for receiving an indication that tone reservation is to be applied, to a subsequent communication, including applying rate matching on a first set of TR subcarriers and applying puncturing on a second set of the TR subcarriers; and means for transmitting the subsequent communication based at least in part on rate matching being applied to the first set of the TR subcarriers and puncturing being applied to the second set of the TR subcarriers.

In some aspects, an apparatus for wireless communication includes means for transmitting an indication that tone reservation is to be applied, to a subsequent communication, including applying rate matching on a first set of TR subcarriers and applying puncturing on a second set of the TR subcarriers; and means for receiving the subsequent communication based at least in part on rate matching being applied to the first set of the TR subcarriers and puncturing being applied to the second set of the TR subcarriers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-7 are diagrams illustrating examples associated with joint rate matching and puncturing for channel oriented tone reservation, in accordance with the present disclosure.

DETAILED DESCRIPTION

Figure 1:
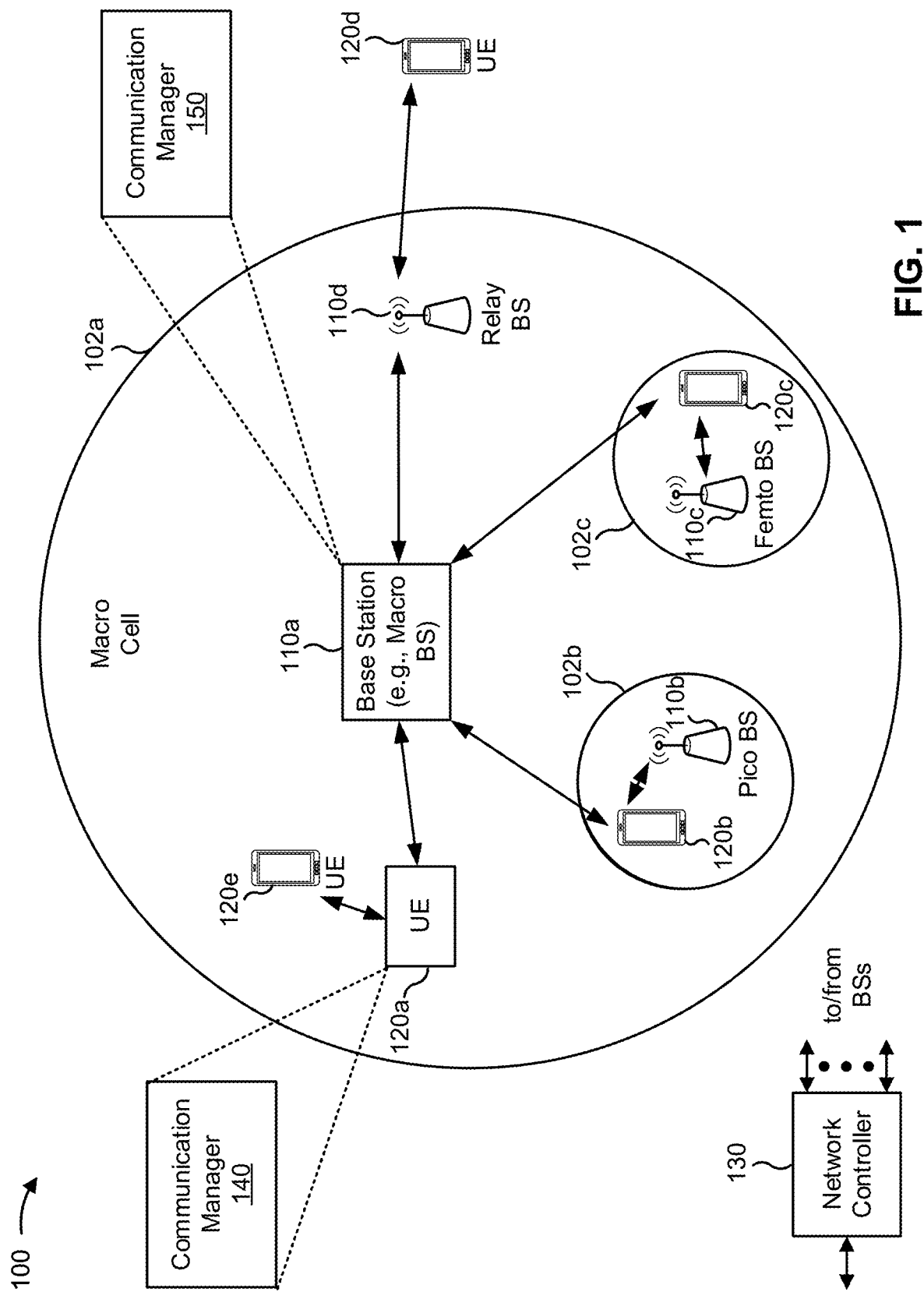
FIG. 1 is a diagram illustrating an example of a wireless network, in accordance with the present disclosure.

Tone reservation (e.g., foregoing transmission of data on one or more subcarriers of a communication and/or transmitting a signal to improve a peak-to-average-power ratio (PAPR) of the communication on the one or more subcarriers, among other examples) may be used by a transmitting device to improve PAPR of a communication to a receiving device. This may improve a likelihood of decoding and/or demodulating the communication by the receiving device. Tone reservation may be applied to fixed subcarriers, which reduces throughput on the communication and may replace data on high-energy subcarriers that have a relatively high likelihood of being decoded and demodulated by the receiving device. Alternatively, tone reservation may be applied to subcarriers that are based at least in part on energies of the subcarriers as expected to be received by the receiving device (e.g., using low energy subcarriers). However, signaling for use of tone reservation may consume resources as overhead, which may decrease throughput and/or spectral efficiency.

In some aspects described herein, a transmitting device (e.g., a base station or a user equipment (UE), among other examples) may transmit an indication that tone reservation is to be applied to one or more subcarriers for a communication, and a receiving device (e.g., a UE or a base station, among other examples) may receive the indication. The indication may indicate that rate matching is to be applied on a first set of TR subcarriers and that puncturing is to be applied on a second set of the TR subcarriers. The transmitting device may select the TR subcarriers based at least in part on an estimate of a channel response at the receiving device (e.g., may select TR subcarriers as the lowest energy subcarriers of the communication as observed at the receiving device). The receiving device may estimate the TR subcarriers (e.g., attempt to identify the TR subcarriers) based at least in part on energies of subcarriers of the communication, with the energies determined using data symbols and/or demodulation reference signals (DMRS) of the communication. Based at least in part on estimating the TR subcarriers based at least in part on the channel response, the receiving device may identify the TR subcarriers without receiving signaling indicating locations of the TR subcarriers.

Applying rate matching by a receiving device (e.g., the UE or the base station) may include discarding the first set of subcarriers, update an allocation (e.g., an allocation size) and code rate accordingly and attempt to use an allocation that includes the data symbols (e.g., excluding subcarriers used for tone reservation from a decoding and/or demodulation operation). A transmitting device may apply rate matching based at least in part on changing an allocation size or code rate according to a number of subcarriers dedicated to tone reservation signaling. and the UE will update its allocation, code rate accordingly and try to allocate the data symbols.

Applying puncturing by a receiving device includes zeroing out values of the second set of subcarriers, but still including the second set of subcarriers in the decoding and/or demodulation operation. A transmitting device may apply puncturing based at least in part on replacing data symbols with tone reservation signaling. In some aspects, the second set of TR subcarriers may include subcarriers that are between the first set of TR subcarriers and data subcarriers of the communication. For example, the second set of TR subcarriers may be between the first set of TR subcarriers and the data subcarriers in a frequency domain and/or in an energy spectrum (e.g., the second set of TR subcarriers have energies within a range that is between energies of the first set of TR subcarriers and energies of the data subcarriers). Based at least in part on applying rate matching to a first set of the TR subcarriers, the transmitting device and/or the receiving device may configure coding rates of the communication for improved spectral efficiency. Based at least in part on applying puncturing to the second set of the TR subcarriers, the UE may avoid errors that may otherwise be caused by incorrectly identifying a data subcarrier as a rate matched TR subcarrier.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive an indication that tone reservation is to be applied to a subsequent communication including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers. Additionally, or alternatively, the communication manager 140 may perform one or more other operations described herein.

In some aspects, the base station 110 may include a communication manager 150. As described in more detail elsewhere herein, the communication manager 150 may transmit an indication that tone reservation is to be applied to a subsequent communication including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers. Additionally, or alternatively, the communication manager 150 may perform one or more other operations described herein.

In some aspects, the UE 120 may include a communication manager 140. As described in more detail elsewhere herein, the communication manager 140 may receive an indication that tone reservation is to be applied to a subsequent communication including applying rate matching on a first set of TR subcarriers and applying puncturing on a second set of the TR subcarriers; and transmit the subsequent communication based at least in part on rate matching being applied to the first set of the TR subcarriers and puncturing being applied to the second set of the TR subcarriers. Additionally, or alternatively, the communication manager 140 may perform one or more other operations described herein.

In some aspects, the base station 110 may include a communication manager 150. As described in more detail elsewhere herein, the communication manager 150 may transmit an indication that tone reservation is to be applied to a subsequent communication including applying rate matching on a first set of TR subcarriers and applying puncturing on a second set of the TR subcarriers; and receive the subsequent communication based at least in part on rate matching being applied to the first set of the TR subcarriers and puncturing being applied to the second set of the TR subcarriers. Additionally, or alternatively, the communication manager 150 may perform one or more other operations described herein.

As indicated above, FIG. 1 is provided as an example. Other examples may differ from what is described with regard to FIG. 1.

Figure 2:
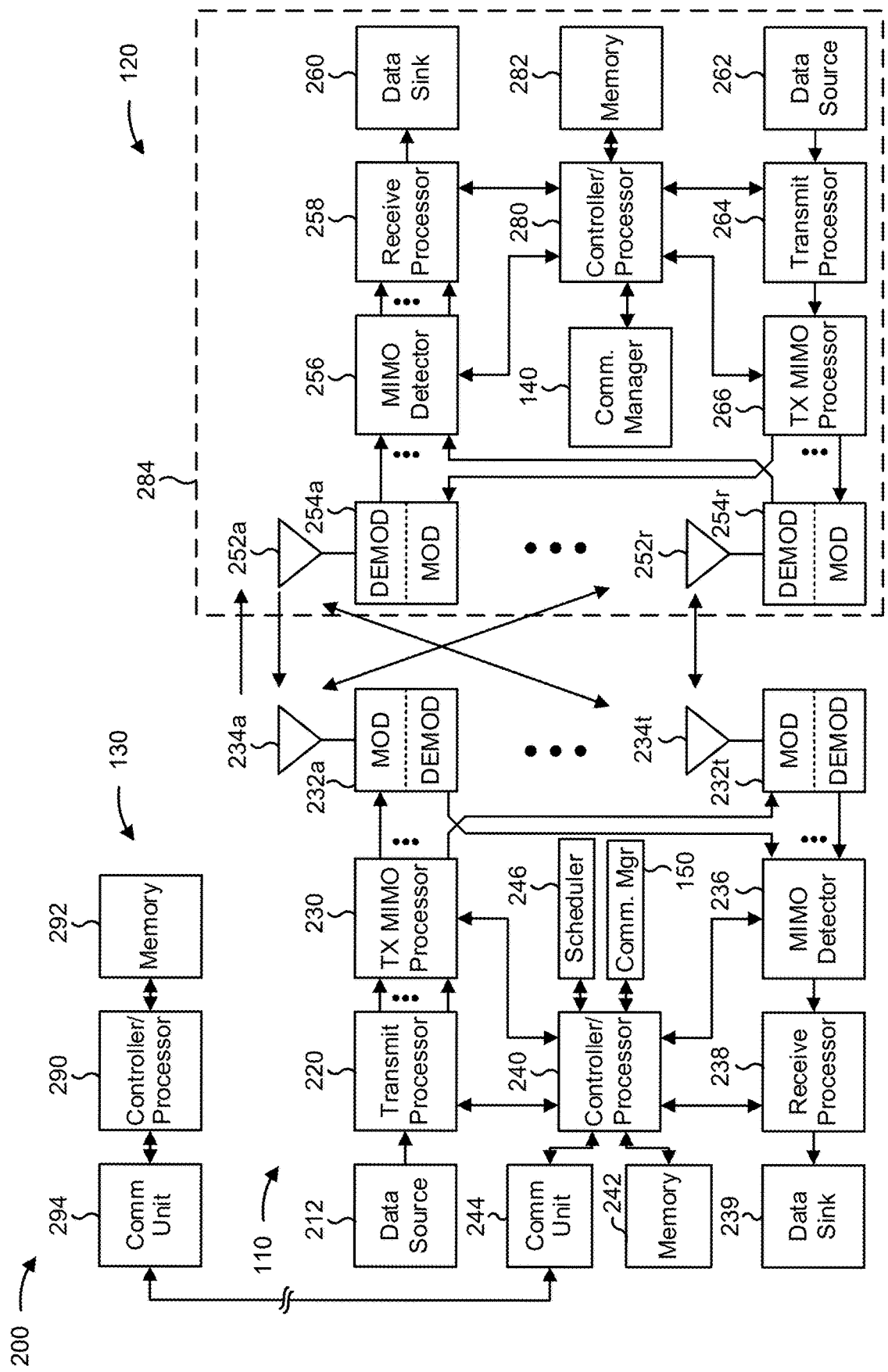
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-11.

Controller/processor 240 of base station 110, controller/processor 280 of UE 120, and/or any other component(s) of FIG. 2 may perform one or more techniques associated with joint rate matching and puncturing for channel oriented tone reservation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively.

In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE includes means for receiving an indication that tone reservation is to be applied, to a subsequent communication, including applying rate matching on a first set of TR subcarriers and applying puncturing on a second set of the TR subcarriers; and/or means for receiving the subsequent communication based at least in part on rate matching being applied to the first set of the TR subcarriers and puncturing being applied to the second set of the TR subcarriers. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting an indication that tone reservation is to be applied, to a subsequent communication, including applying rate matching on a first set of TR subcarriers and applying puncturing on a second set of the TR subcarriers; and/or means for transmitting the subsequent communication based at least in part on rate matching being applied to the first set of the TR subcarriers and puncturing being applied to the second set of the TR subcarriers. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the UE includes means for receiving an indication that tone reservation is to be applied, to a subsequent communication, including applying rate matching on a first set of TR subcarriers and applying puncturing on a second set of the TR subcarriers; and/or means for transmitting the subsequent communication based at least in part on rate matching being applied to the first set of the TR subcarriers and puncturing being applied to the second set of the TR subcarriers. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting an indication that tone reservation is to be applied, to a subsequent communication, including applying rate matching on a first set of TR subcarriers and applying puncturing on a second set of the TR subcarriers; and/or means for receiving the subsequent communication based at least in part on rate matching being applied to the first set of the TR subcarriers and puncturing being applied to the second set of the TR subcarriers. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
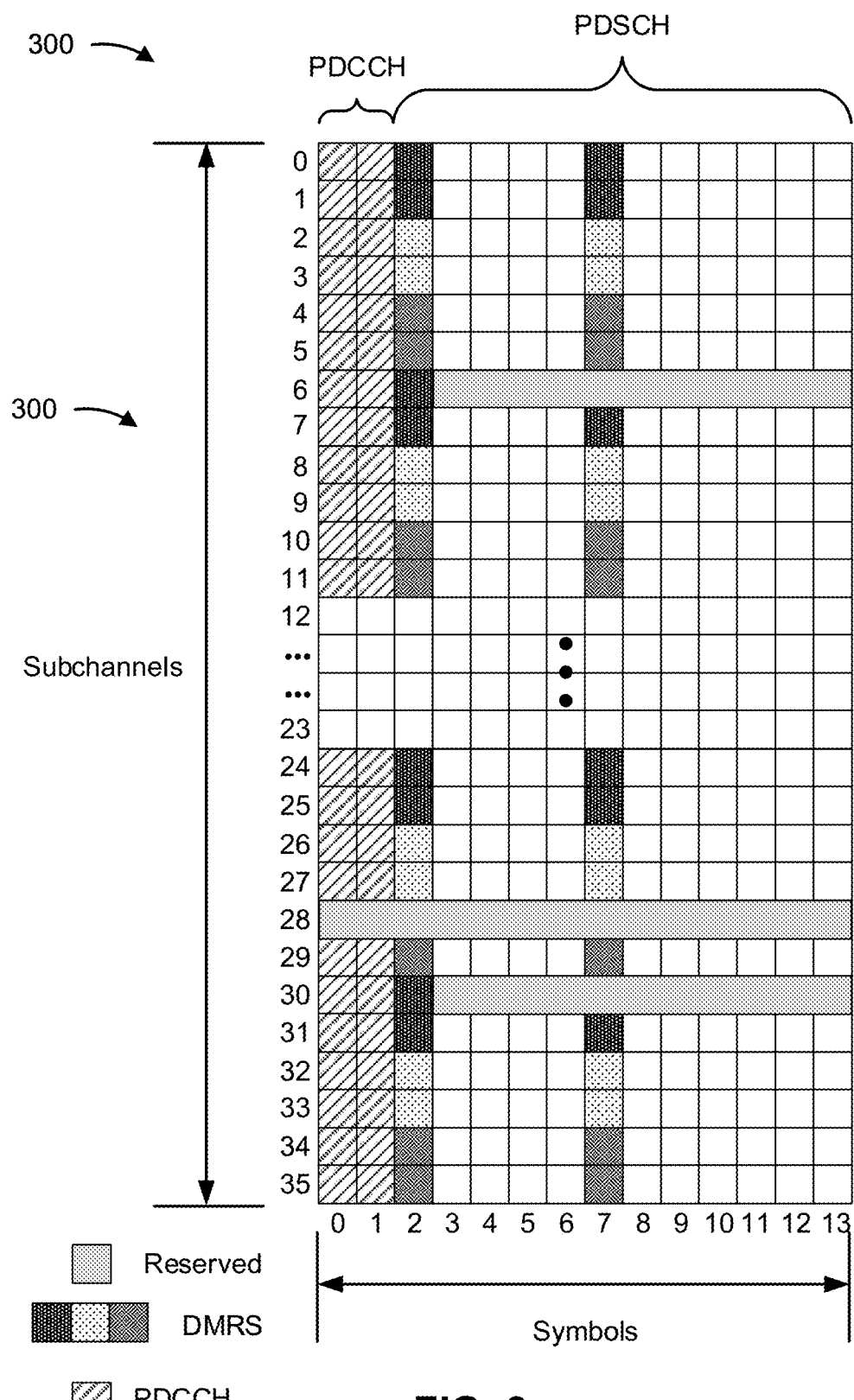
FIG. 3 is a diagram illustrating an example of tone reservation, in accordance with the present disclosure.

FIG. 3 is a diagram illustrating an example 300 of UE subcarrier tone reservation on one or more subcarriers, in accordance with the present disclosure. In some networks, a base station may transmit a downlink transmission on a physical downlink shared channel (PDSCH) with tone reservation on one or more subcarriers based at least in part on measurement(s) of uplink signals from a UE, a request from the UE, an indication of a capability of the UE, and/or an independent determination by the base station, among other examples (e.g., as described herein).

In some aspects, the UE may be configured to communicate with the base station with a configuration for tone reservation. For example, the configuration may be common for multiple communications (e.g., for a configured grant and/or semi-persistent scheduling resources), multiple UEs connected to the base station, a beam provided by the base station, a cell provided by the base station, and/or the like.

As shown by example 300, a PDSCH may include one or more reserved subcarriers (e.g., tones) on which data and/or pilots are not to be transmitted. In some aspects, the subcarriers may be empty (e.g., not having any information intended for transmission to the UE). Additionally, or alternatively, tone reservation may be applied to physical downlink control channel (PDCCH) symbols (e.g., symbols 0 and 1 in FIG. 3). In some aspects, a pilot may include or may be a reference signal. In some aspects, the base station may transmit a signal that is configured to improve a PAPR for a downlink transmission on the PDSCH by using tone reservation to forego transmission of data and/or pilots on the one or more reserved subcarriers. While example 300 provides an example of tone reservation applied to PDSCH and/or PDCCH, in some aspects (e.g., when a UE applies tone reservation to uplink communications transmitted to a base station), tone reservation may be applied to physical uplink shared channel (PUSCH) and/or physical uplink control channel (PUCCH) symbols.

Signaling for use of tone reservation may consume resources as overhead, which may decrease throughput and/or spectral efficiency. For example, to enable the UE to identify which subcarriers have tone reservation applied, the base station may indicate the frequency locations (e.g., using indices) of the subcarriers to the UE. These indications may consume communication, network, and power resources. Additionally, or alternatively, consumption of network resources for the indications may decrease throughput available for data (e.g., associated with the PDSCH). In a communication where tone reservation is not used, an increase in PAPR may occur, which may degrade communications between the base station and the UE, and may negatively affect an efficiency of power amplification at the base station. Based at least in part on degradation of the communications, the UE and/or the base station may consume power, communication, network, and computing resources to detect and/or correct communication errors associated with the degradation.

As indicated above, FIG. 3 is provided as an example. Other examples may differ from what is described with respect to FIG. 3.

In some aspects described herein, a transmitting device (e.g., a base station or a UE, among other examples) may transmit an indication that tone reservation is to be applied to one or more subcarriers for a communication, and a receiving device (e.g., a UE or a base station, among other examples) may receive the indication. The indication may indicate that rate matching is to be applied on a first set of TR subcarriers and that puncturing is to be applied on a second set of the TR subcarriers. The transmitting device may select the TR subcarriers based at least in part on an estimate of a channel response at the receiving device (e.g., may select TR subcarriers as the lowest energy subcarriers of the communication as observed at the receiving device). The receiving device may estimate the TR subcarriers (e.g., attempt to identify the TR subcarriers) based at least in part on energies of subcarriers of the communication, with the energies determined using data symbols and/or DMRSs of the communication. Based at least in part on estimating the TR subcarriers based at least in part on the channel response, the receiving device may identify the TR subcarriers without receiving signaling indicating locations of the TR subcarriers.

Applying rate matching may include discarding the first set of subcarriers (e.g., excluding the second set of subcarriers from a decoding and/or demodulation operation). Applying puncturing to the second set of subcarriers include zeroing out values of the second set of subcarriers, but still including the second set of subcarriers in the decoding and/or demodulation operation. In some aspects, the second set of TR subcarriers may include subcarriers that are between the first set of TR subcarriers and data subcarriers of the communication. For example, the second set of TR subcarriers may be between the first set of TR subcarriers and the data subcarriers in a frequency domain and/or in an energy spectrum (e.g., the second set of TR subcarriers have energies within a range that is between energies of the first set of TR subcarriers and energies of the data subcarriers). Based at least in part on applying rate matching to a first set of the TR subcarriers, the transmitting device and/or the receiving device may configure coding rates of the communication for improved spectral efficiency. Based at least in part on applying puncturing to the second set of the TR subcarriers, the receiving device may avoid errors that may otherwise be caused by incorrectly identifying a data subcarrier as a rate matched TR subcarrier. For example, incorrectly identifying a data subcarrier as a rate matched TR subcarrier may cause the receiving device to incorrectly discard the incorrectly identified subcarrier (e.g., and losing the signaling on the subcarrier), but may also incorrectly assign subcarrier indices for multiple subsequent subcarriers based at least in part on shifting the subcarrier indices by 1 or more values. The receiving device may discard all of the multiple subsequent subcarriers as failed signals.

Figure 4:
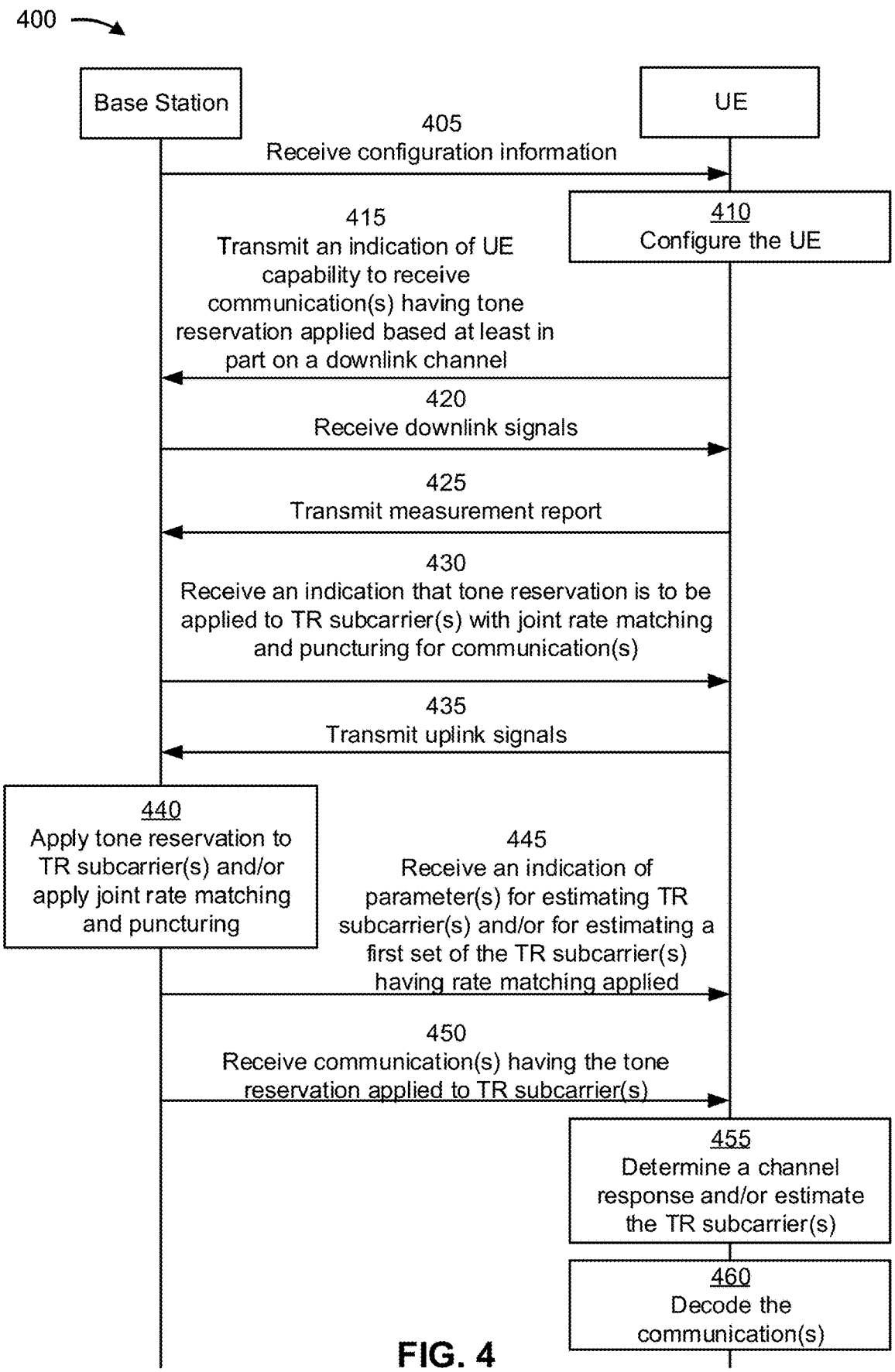

FIG. 4 is a diagram illustrating an example 400 associated with joint rate matching and puncturing for channel oriented tone reservation, in accordance with the present disclosure. As shown in FIG. 4, a base station (e.g., base station 110) may communicate with a UE (e.g., UE 120). In some aspects, the base station and the UE may be part of a wireless network (e.g., wireless network 100). As shown in FIG. 4, the base station may apply tone reservation for downlink communications.

As shown by reference number 405, the base station may transmit, and the UE may receive, configuration information. In some aspects, the UE may receive the configuration information via one or more of radio resource control (RRC) signaling, medium access control (MAC) control elements (CEs) (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of UE capability (e.g., UE support) to receive one or more downlink communications having tone reservation applied based at least in part on a downlink channel. In some aspects, the configuration information may indicate that the UE is to receive an indication that tone reservation is to be applied to one or more TR subcarriers with joint rate matching and puncturing for one or more downlink communications. For example, the configuration information may indicate that the UE is to receive the indication via RRC signaling, MAC signaling, and/or DCI, among other examples. In some aspects, the indication may include an indication of a number of subcarriers to which tone reservation is to be applied, a fraction of subcarriers to which tone reservation is to be applied, and/or a threshold power for subcarriers to which tone reservation is to be applied. In some aspects, the indication may include an indication of a number of subcarriers to which rate matching is to be applied, a fraction of subcarriers to which rate matching is to be applied, and/or a threshold power for subcarriers to which rate matching is to be applied (e.g., relative to all subcarriers of the downlink communications and/or relative to the one or more TR subcarriers). In some aspects, the configuration information may indicate that the UE is to transmit one or more uplink signals (e.g., sounding reference signals), using the one or more TR subcarriers (e.g., using subcarriers the same frequency ranges as the one or more TR subcarriers), for measurement by the base station. In some aspects, the configuration information may indicate that the UE is to transmit an indication of a measurement of one or more signal-to-interference-plus-noise ratios (SINRs) based at least in part on reception of one or more downlink reference signals. In some aspects, the configuration information may indicate that the UE is to determine a channel response of the one or more downlink communications (e.g., based at least on part on data symbols of the one or more downlink communications) and generate a set of estimated indices of the one or more TR subcarriers having tone reservation applied based at least in part on received energy (e.g., power) on the one or more TR subcarriers. For example, the configuration information may indicate that the UE is to generate the set of estimated indices to include indices for one or more TR subcarriers having a lowest received energy of subcarriers of the one or more downlink communications.

In some aspects, the configuration information may indicate that the UE is to decode the one or more downlink communications based at least in part on discarding a first set of the one or more TR subcarriers having rate matching applied (e.g., estimated to have rate matching applied) and zeroing out log likelihood ratios (LLRs) for a second set of the one or more TR subcarriers having puncturing applied (e.g., estimated to have puncturing applied).

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of a UE capability to receive downlink communications having tone reservation applied (e.g., with joint rate matching and puncturing). In some aspects, the UE may transmit the indication as part of an RRC configuration process. For example, the UE may transmit the indication in connection with a UE capability report during or after an RRC configuration process. In some aspects, the UE capability to receive the downlink communications having the tone reservation applied may be based at least in part on a configuration of the UE, components of the UE, and/or availability of resources of the UE that may be used to determine subchannels to which tone reservation has been applied within a threshold amount of time.

As shown by reference number 420, the base station may transmit, and the UE may receive, one or more downlink signals, such as one or more downlink reference signals. In some aspects, the base station may transmit one or more channel state information reference signals (CSI-RSs) and/or one or more synchronization signal blocks (SSBs), among other examples, for the UE to measure. The UE may measure the one or more downlink signals to determine one or more SINRs associated with one or more channels via which the UE receives communications from the base station.

As shown by reference number 425, the UE may transmit, and the base station may receive, a measurement report. In some aspects, the UE may transmit, and the base station may receive, a measurement of one or more SINRs that are based at least in part on reception of the one or more downlink signals. In some aspects, the base station may determine whether to use tone reservation for subsequent downlink communications based at least in part on the measurement report and/or whether to use joint rate matching and puncturing on the one or more TR subcarriers. For example, the base station may determine to use tone reservation based at least in part on a relatively low SINR (e.g., less than or equal to a threshold) and/or may determine to not use tone reservation based at least in part on a relatively high SINR (e.g., greater than or equal to a threshold). In some aspects, the base station may determine an amount (e.g., a level or a degree) of tone reservation to apply based at least in part on the measurement report. For example, the base station may determine a number of subcarriers to which tone reservation is to be applied, a fraction of subcarriers to which tone reservation is to be applied, or a threshold power for subcarriers to which tone reservation is to be applied based at least in part on the one or more SINRs indicated in the measurement report. Additionally, or alternatively, the base station may determine a number of subcarriers to which rate matching is to be applied, a fraction of subcarriers to which rate matching is to be applied, or a threshold power for subcarriers to which rate matching is to be applied based at least in part on the one or more SINRs indicated in the measurement report.

As shown by reference number 430, the base station may transmit, and the UE may receive, an indication that tone reservation is to be applied to one or more TR subcarriers with joint rate matching and puncturing for one or more downlink communications and/or that the UE is to use data symbols to estimate locations of the one or more TR subcarriers.

In some aspects, the indication that tone reservation is to be applied may include an indication of a number of subcarriers to which tone reservation is to be applied, a fraction (e.g., percentage) of subcarriers to which tone reservation is to be applied, and/or a threshold power for subcarriers to which tone reservation is to be applied, among other examples. For example, the indication may include information that indicates that the N subcarriers with the lowest energy and/or power (e.g., based on signal-to-noise ratio (SNR) measurements, SINR measurements, and/or RSSI measurements) are to have tone reservation applied, where N is non-negative integer (e.g., a positive integer). As another example, the indication may include information that indicates a fraction or percentage (e.g., one fourth, one tenth, 5%, 10%, 20%, or the like) of subcarriers to which tone reservation is to be applied (e.g., subcarriers in the bottom fourth, tenth, 5%, 10%, 20%, or the like, in energy and/or power). As yet another example, the indication may include information that indicates a threshold power (e.g., 0 dB, −5 dB, −10 dB, or the like), and that tone reservation is to be applied to subcarriers associated with uplink signals that fail to satisfy the threshold power.

Similarly, the indication may include an indication of a number of subcarriers to which rate matching is to be applied, a fraction (e.g., percentage) of subcarriers to which rate matching is to be applied, and/or a threshold power for subcarriers to which rate matching is to be applied, among other examples. The indication may include any of the described indications associated with a number of subcarriers to which rate matching is to be applied based at least in part on an indication associated with a number of subcarriers to which puncturing is to be applied. For example, the indication may indicate a number of TR subcarriers and a number of the TR subcarriers that are to have puncturing applied, and the number of subcarriers that are to have rate matching applied is the difference between the two. Additionally, or alternatively, the indication may indicate a number of subcarriers to which tone reservation is to be applied, a fraction of subcarriers to which tone reservation is to be applied, or a threshold energy for subcarriers to which tone reservation is to be applied.

In some aspects, the indication that tone reservation is to be applied may include information identifying a tone reservation optimization technique or formula. For example, based at least in part on the number of subcarriers, the fraction of subcarriers, and/or the threshold power for subcarriers to which tone reservation is to be applied, an optimization technique may be implemented to identify subcarriers for tone reservation in a manner that optimizes PAPR with a constraint of a maximum power (e.g., transmit power) that is equal to the power used for the PDSCH and/or PUCCH subcarrier. In some aspects, the indication may include information that indicates that tone reservation optimization techniques are to be performed in iterations, are to be generated by applying machine learning, are to be generated using constrained or unconstrained optimization, or are to be generated by testing hypothesis iterations, among other examples. In some aspects, the indication may include information identifying a minimum tone reservation power constraint to be used (e.g., in a manner designed to improve UE detection).

In some aspects, the indication that tone reservation is to be applied may include information identifying a PAPR threshold to be achieved by tone reservation, and may include information indicating that various tone reservation and/or optimization techniques are to be used until the PAPR threshold is satisfied. For example, the indication may include information identifying the PAPR threshold and information indicating that the lowest energy subcarriers are to be iteratively discarded until the PAPR threshold is reached (e.g., starting with discarding the lowest 1% of subcarriers and incrementing by +1% until the PAPR threshold is satisfied).

As shown by reference number 435, the UE may transmit, and the base station may receive, one or more uplink signals. In some aspects, the one or more uplink signals may be transmitted by the UE for measurement by the base station (e.g., for the base station to identify subcarriers to which tone reservation is to be applied). In some aspects, the one or more uplink signals include one or more sounding reference signals (SRSs).

As shown by reference number 440, the base station may apply tone reservation to one or more TR subcarriers (e.g., based at least in part on received energy on the one or more uplink signals) and/or may apply joint rate matching and puncturing.

In some aspects, the base station may determine channel conditions (e.g., received energy measurements, one or more SINR values, and/or one or more PAPR values, among other examples) based at least in part on the one or more uplink signals and apply tone reservation based at least in part on the channel conditions. In some aspects, the base station may apply tone reservation to the one or more TR subcarriers based at least in part on the one or more TR subcarriers having a lowest received energy of subcarriers of the one or more uplink signals. In some aspects, the base station may apply tone reservation based at least in part on receiving the indication of the measurement of one or more SINRs (e.g., the measurement report described in connection with reference number 425) and/or based at least in part on transmission of one or more downlink reference signals (e.g., the downlink signals described in connection with reference number 420).

In some aspects, the base station may apply tone reservation to a number of subcarriers, a fraction (e.g., percentage) of subcarriers, and/or based at least in part on a threshold power for subcarriers, among other examples (e.g., as described herein). In some aspects, the base station may apply tone reservation using a tone reservation optimization technique (e.g., as described herein). In some aspects, the base station may apply tone reservation based at least in part on a PAPR threshold and/or various tone reservation and/or optimization techniques to be iteratively used until the PAPR threshold is satisfied (e.g., as described herein).

In some aspects, the base station may prepare a UE report indicating whether tone reservation is applied and indicating a number of subcarrier(s) (e.g., fraction or percentage) to which tone reservation is applied. In some aspects, the tone reservation frequency locations (e.g., subcarrier identifiers) and corresponding values may be identified to a mapper, along with data and/or pilots for transmission to the UE (e.g., using OFDM transmission protocol (e.g., inverse fast Fourier transform (IFFT))). The mapper may map the data and/or pilots to subcarriers of the channel, excluding subcarriers to which tone reservation is applied.

Applying joint rate matching and puncturing may include applying rate matching to a first set of the TR subcarriers and applying puncturing to a second set of the TR subcarriers. In some aspects, the TR subcarriers include one or more sets of consecutive subcarriers over one or more frequency ranges, and the second set of the TR subcarriers comprises subcarriers on ends of the one or more frequency ranges. For example, the second set of TR subcarriers may be positioned between subcarriers of the first set of TR subcarriers (e.g., located in middle portions of the one or more frequency ranges) and data subcarriers. In some aspects, subcarriers of the first set of the TR subcarriers are estimated to be received by a user equipment with energies within a first range of energies and subcarriers of the second set of the TR subcarriers are estimated to be received by the user equipment with energies within a second range of energies, with the second range of energies being higher than the first range of energies. In some aspects, the base station may apply puncturing to TR subcarriers that are within a threshold energy gap from the data subcarriers to decrease a likelihood of the UE misidentifying a data subcarrier as a subcarrier of the first set of TR subcarriers that is rate matched. In some aspects, the base station may apply rate matching on the first set of the TR subcarriers and apply puncturing on the second set of the TR subcarriers based at least in part on an estimated channel response of a downlink channel, a likelihood of a user equipment to identify the first set of the TR subcarriers, and/or a likelihood of the user equipment to identify a data subcarrier as having rate matching applied.

As shown by reference number 445, the UE may receive, and the base station may transmit, an indication of one or more parameters for estimating the TR subcarriers and/or for estimating the first set of the TR subcarriers having rate matching applied (e.g., and or the second set of the TR subcarriers having puncturing applied). In some aspects, the base station may transmit the indication of the one or more parameters via within DCI, such as a DCI that schedules the one or more downlink communications.

In some aspects, the one or more parameters may include an explicit indication of the number of the TR subcarriers within the subsequent communication, an indication of a fraction of subcarriers of the communication that are TR subcarriers, or a threshold energy for TR subcarriers. In some aspects, the one or more parameters may include an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers. In some aspects, the one or more parameters may include an explicit indication of the number of the TR subcarriers within the second set of the TR subcarriers, an indication of a fraction of subcarriers of the subsequent communication that are within the second set of the TR subcarriers, an indication of a fraction of the TR subcarriers that are within the second set of the TR subcarriers, or a threshold energy for TR subcarriers to be within the second set of the TR subcarriers As shown by reference number 450, the base station may transmit, and the UE may receive, one or more downlink communications having the tone reservation applied to the one or more TR subcarriers. In some aspects, one or more TR subcarriers to which tone reservation is applied (e.g., by the base station) and/or a number of the one or more TR subcarriers that are in the first set of TR subcarriers are based at least in part on the measurement of the one or more uplink signals on the subcarrier(s) (e.g., as described herein). As described above, the UE may receive an indication of the parameters for estimating the TR subcarriers along with (e.g., in a same set of allocated resources as) the one or more communications.

As shown by reference number 455, the UE may determine a channel response and/or estimate the one or more TR subcarriers. In some aspects, the UE may estimate the TR subcarriers having tone reservation applied based at least in part on received energy on the TR subcarriers and may estimate the first set of the TR subcarriers and the second set of the TR subcarriers based at least in part on received energy on the TR subcarriers.

In some aspects, the UE may determine the channel response of the one or more downlink communications to generate a set of estimated indices of the TR subcarriers and/or the TR subcarriers in the first set of the TR subcarriers. For example, the UE may generate the set of estimated indices based at least in part on received energy on the one or more TR subcarriers of the one or more downlink communications. In some aspects, the UE may generate the set of estimated indices based at least in part on the configuration information (e.g., described above in connection with reference number 405), and/or the indication that tone reservation is to be applied (e.g., described above in connection with reference number 430), among other examples. In some aspects, the UE may determine the channel response based at least in part on data symbols and/or DMRS symbols of the one or more downlink communications (e.g., based at least in part on an estimation of the lowest energy subcarriers using the data symbols and/or the DMRSs).

In some aspects, the UE may generate the set of estimated indices to indicate one or more TR subcarriers having lowest received energies of subcarriers used for the one or more downlink communications. In some aspects, the set of estimated indices may include a number of indices based at least in part on information included in the indication that tone reservation is to be applied to the one or more TR subcarriers (e.g., described above in connection with reference number 430).

As shown by reference number 460, the UE may decode the one or more communications. In some aspects, the UE may decode the one or more downlink communications based at least in part on the tone reservation being applied to the one or more TR subcarriers. In some aspects, the UE may use information included in the indication that tone reservation is to be applied to the one or more TR subcarriers (e.g., described above in connection with reference number 430) to decode the one or more downlink communications. In some aspects, the UE may decode the one or more downlink communications based at least in part on discarding samplings received via the first set of the TR subcarriers and zeroing samplings received via the second set of the TR subcarriers.

As indicated above, FIG. 4 is provided as an example. Other examples may differ from what is described with respect to FIG. 4.

Figure 5:
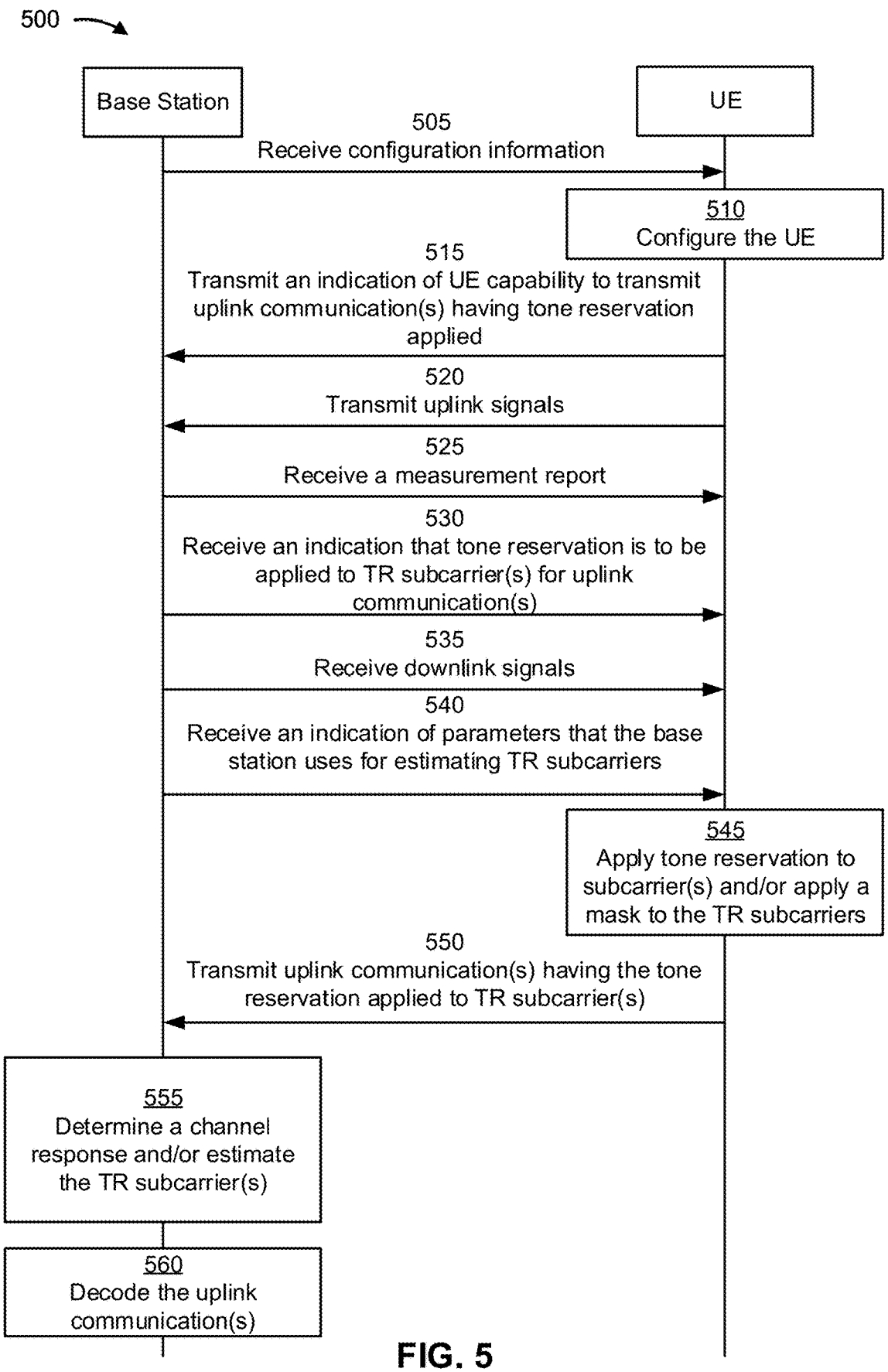

FIG. 5 is a diagram illustrating an example 500 associated with joint rate matching and puncturing for channel oriented tone reservation, in accordance with the present disclosure. As shown in FIG. 5, a base station (e.g., base station 110) may communicate with a UE (e.g., UE 120). In some aspects, the base station and the UE may be part of a wireless network (e.g., wireless network 100). As shown in FIG. 5, the UE may apply tone reservation for downlink communications.

As shown by reference number 505, the UE may receive, and the base station may transmit configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to receive an indication that tone reservation is to be applied to one or more TR subcarriers with joint rate matching and puncturing for one or more uplink communications. For example, the configuration information may indicate that the UE is to receive the indication via RRC signaling, MAC signaling, and/or DCI, among other examples. In some aspects, the indication may include an indication of a number of subcarriers to which tone reservation is to be applied, a fraction of subcarriers to which tone reservation is to be applied, and/or a threshold power for subcarriers to which tone reservation is to be applied. In some aspects, the indication may include an indication of a number of subcarriers to which rate matching is to be applied, a fraction of subcarriers to which rate matching is to be applied, and/or a threshold power for subcarriers to which rate matching is to be applied. In some aspects, the configuration information may indicate that the UE is to transmit one or more uplink signals (e.g., sounding reference signals), using the one or more TR subcarriers, for measurement by the base station. In some aspects, the configuration information may indicate that the UE is to determine a channel response of an uplink channel based at least in part on downlink signals received from the base station. The configuration information may indicate that the UE is to apply tone reservation to the one or more TR subcarriers including joint rate matching and puncturing.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, an indication of a UE capability to transmit uplink communications having tone reservation applied (e.g., with joint rate matching and puncturing). In some aspects, the UE may transmit the indication as part of an RRC configuration process. For example, the UE may transmit the indication in connection with a UE capability report during or after an RRC configuration process. In some aspects, the UE capability to transmit the uplink communications having the tone reservation applied may be based at least in part on a configuration of the UE, components of the UE, and/or availability of resources of the UE that may be used to determine the one or more TR subcarriers, within a threshold amount of time, to which tone reservation is to be applied.

As shown by reference number 520, the UE may transmit, and the base station may receive, one or more uplink signals. In some aspects, the one or more uplink signals may be transmitted by the UE for measurement by the base station (e.g., to enable the base station to determine whether tone reservation is to be applied to uplink communications and/or to generate a measurement report for transmission to the base station, among other examples). In some aspects, the one or more uplink signals include one or more SRSs.

As shown by reference number 525, the base station may transmit, and the UE may receive, a measurement report. In some aspects, the base station may transmit a measurement of one or more SINRs that are based at least in part on reception of the one or more uplink signals. In some aspects, the UE may determine an amount (e.g., a level or a degree) of tone reservation to apply and/or may identify the one or more TR subcarriers based at least in part on the measurement report. For example, the base station may determine a number of subcarriers to which tone reservation is to be applied, a fraction of subcarriers to which tone reservation is to be applied, or a threshold power for subcarriers to which tone reservation is to be applied based at least in part on the one or more SINRs indicated in the measurement report. Additionally, or alternatively, the UE may determine TR subcarriers to which rate matching is to be applied and/or TR subcarriers to which puncturing is to be applied.

As shown by reference number 530, the base station may transmit, and the UE may receive, an indication that tone reservation is to be applied to one or more TR subcarriers for one or more uplink communications. In some aspects, the UE may receive the indication (e.g., MAC CE with a slot offset between a downlink allocation and corresponding data (K0) greater than or equal to 0) via RRC signaling, MAC signaling, and/or DCI, among other examples. In some aspects, the indication that tone reservation is to be applied to the one or more TR subcarriers may further indicate that one or more parameters (e.g., as described herein) that are to be used to determine the first set of TR subcarriers and the second set of TR subcarriers.

In some aspects, the indication that tone reservation is to be applied to one or more TR subcarriers for one or more uplink communications may have one or more characteristics in common with the indication that tone reservation is to be applied to one or more TR subcarriers for one or more communications described in connection with reference number 430 of FIG. 4.

As shown by reference number 535, the UE may receive, and the base station may transmit, one or more downlink signals. In some aspects, the one or more downlink signals may be transmitted by the base station for measurement by the UE (e.g., to enable the UE to identify subcarriers to which tone reservation is to be applied and/or to identify subcarriers for rate matching, among other examples). In some aspects, the one or more downlink signals may include one or more CSI-RSs, SSBs, or data channel signaling, among other examples. In some aspects, the UE may estimate a channel based at least in part on data symbols of the downlink signals, and/or based at least in part on DMRSs within a data channel and/or within a control channel to estimate a downlink channel. For example, the UE may estimate the channel (e.g., the uplink channel) based at least in part on an assumption of reciprocity with the downlink channel.

As shown by reference number 540, the UE may receive, and the base station may transmit, an indication of one or more parameters that the base station uses for estimating the TR subcarriers and/or for estimating the first set of the TR subcarriers having rate matching applied (e.g., and or the second set of the TR subcarriers having puncturing applied). In some aspects, the base station may transmit the indication of the one or more parameters via within DCI, such as a DCI that schedules the one or more uplink communications.

In some aspects, the one or more parameters may include an explicit indication of the number of the TR subcarriers within the subsequent communication, an indication of a fraction of subcarriers of the communication that are TR subcarriers, or a threshold energy for TR subcarriers. In some aspects, the one or more parameters may include an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers. In some aspects, the one or more parameters may include an explicit indication of the number of the TR subcarriers within the second set of the TR subcarriers, an indication of a fraction of subcarriers of the subsequent communication that are within the second set of the TR subcarriers, an indication of a fraction of the TR subcarriers that are within the second set of the TR subcarriers, or a threshold energy for TR subcarriers to be within the second set of the TR subcarriers As shown by reference number 545, the UE may apply tone reservation to one or more TR subcarriers (e.g., based at least in part on received energy on the one or more downlink signals) and/or may apply joint rate matching and puncturing.

In some aspects, the UE may determine channel conditions (e.g., received energy measurements, one or more SINR values, and/or one or more PAPR values, among other examples) based at least in part on the one or more downlink signals and apply tone reservation based at least in part on the channel conditions. In some aspects, the UE may apply tone reservation to the one or more TR subcarriers based at least in part on the one or more TR subcarriers having a lowest received energy of subcarriers of the one or more downlink signals. In some aspects, the UE may apply tone reservation based at least in part on receiving the indication of the measurement of one or more SINRs (e.g., the measurement report described in connection with reference number 525) and/or based at least in part on transmission of one or more uplink reference signals (e.g., the downlink signals described in connection with reference number 535).

In some aspects, the UE may apply tone reservation to a number of subcarriers, a fraction (e.g., percentage) of subcarriers, and/or based at least in part on a threshold power for subcarriers, among other examples (e.g., as described herein). In some aspects, the UE may apply tone reservation using a tone reservation optimization technique (e.g., as described herein). In some aspects, the UE may apply tone reservation based at least in part on a PAPR threshold and/or various tone reservation and/or optimization techniques to be iteratively used until the PAPR threshold is satisfied (e.g., as described herein).

In some aspects, the UE may apply tone reservation based at least in part on an indication from the base station that indicates a number of subcarrier(s) (e.g., fraction or percentage) to which tone reservation is to be applied. In some aspects, the tone reservation frequency locations (e.g., subcarrier identifiers) and corresponding values may be identified to a mapper, along with data and/or pilots for transmission to the base station (e.g., using OFDM transmission protocol (e.g., IFFT)). The mapper may map the data and/or pilots to subcarriers of the channel, excluding subcarriers to which tone reservation is applied.

Applying joint rate matching and puncturing may include applying rate matching to a first set of the TR subcarriers and applying puncturing to a second set of the TR subcarriers. In some aspects, the TR subcarriers include one or more sets of consecutive subcarriers over one or more frequency ranges, and the second set of the TR subcarriers comprises subcarriers on ends of the one or more frequency ranges. For example, the second set of TR subcarriers may be positioned between subcarriers of the first set of TR subcarriers (e.g., located in middle portions of the one or more frequency ranges) and data subcarriers. In some aspects, subcarriers of the first set of the TR subcarriers are estimated to be received by a user equipment with energies within a first range of energies and subcarriers of the second set of the TR subcarriers are estimated to be received by the user equipment with energies within a second range of energies, with the second range of energies being higher than the first range of energies. In some aspects, the UE may apply puncturing to TR subcarriers that are within a threshold energy gap from the data subcarriers to decrease a likelihood of the base station misidentifying a data subcarrier as a subcarrier of the first set of TR subcarriers that is rate matched. In some aspects, the UE may apply rate matching on the first set of the TR subcarriers and apply puncturing on the second set of the TR subcarriers based at least in part on an estimated channel response of a downlink channel, a likelihood of a user equipment to identify the first set of the TR subcarriers, and/or a likelihood of the user equipment identify a data subcarrier as having rate matching applied.

As shown by reference number 550, the UE may transmit, and the base station may receive, the one or more uplink communications having the tone reservation applied to the one or more TR subcarriers. In some aspects, one or more TR subcarriers to which tone reservation is applied (e.g., by the UE) and/or a number of the one or more TR subcarriers that are in the first set of TR subcarriers are based at least in part on the measurement of the one or more downlink signals on the one or more TR subcarriers (e.g., as described herein).

As shown by reference number 555, the base station may determine a channel response and/or estimate the one or more TR subcarriers. In some aspects, estimating the TR subcarriers includes attempting to identify the TR subcarriers based at least in part on a channel response of a channel that carries the one or more uplink communications. In some aspects, the base station may estimate the TR subcarriers having tone reservation applied based at least in part on received energy on the TR subcarriers and may estimate the first set of the TR subcarriers and the second set of the TR subcarriers based at least in part on received energy on the TR subcarriers.

In some aspects, the base station may determine a channel response of the one or more downlink communications to generate the set of estimated indices. For example, the base station may generate the set of estimated indices based at least in part on received energy on the one or more TR subcarriers of the one or more uplink communications. In some aspects, the base station may generate the set of estimated indices based at least in part on the indication that tone reservation is to be applied (e.g., described above in connection with reference number 530), among other examples. In some aspects, the base station may determine the channel response based at least in part on data symbols and/or DMRS symbols of the one or more uplink communications (e.g., based at least in part on an estimation of the lowest energy subcarriers using the data symbols and/or the DMRSs).

In some aspects, the base station may generate the set of estimated indices to indicate one or more TR subcarriers having lowest received energies of subcarriers used for the one or more uplink communications. In some aspects, the set of estimated indices may include a number of indices based at least in part on information included in the indication that tone reservation is to be applied to the one or more TR subcarriers (e.g., described above in connection with reference number 530).

As shown by reference number 560, the base station may decode the one or more uplink communications. In some aspects, the base station may decode the one or more uplink communications based at least in part on the tone reservation being applied to the one or more TR subcarriers. In some aspects, the base station may use information included in the indication that tone reservation is to be applied to the one or more TR subcarriers (e.g., described above in connection with reference number 530) to decode the one or more uplink communications. In some aspects, the base station may decode the one or more uplink communications based at least in part on discarding samplings received via the first set of the TR subcarriers and zeroing samplings received via the second set of the TR subcarriers.

As indicated above, FIG. 5 is provided as an example. Other examples may differ from what is described with respect to FIG. 5.

Figure 6:
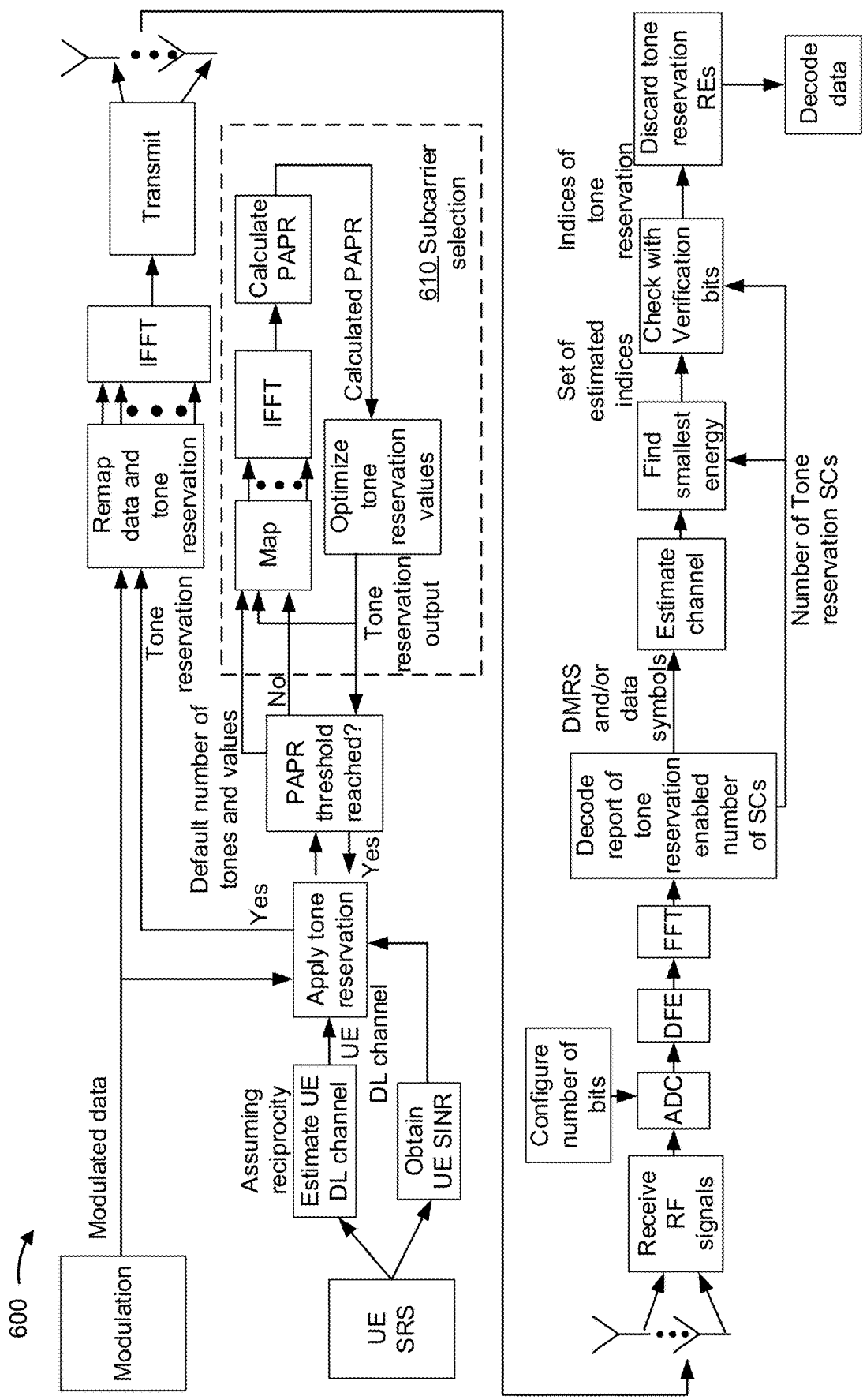

FIG. 6 is a diagram illustrating an example 600 associated with joint rate matching and puncturing for channel oriented tone reservation, in accordance with the present disclosure. As shown in FIG. 6, tone reservation may be applied to communications transmitted from a base station to a UE.

As shown in example 600, the base station may measure one or more UE SRSs to estimate an uplink channel. The base station may use the estimate of the uplink channel to estimate a downlink channel (e.g., using an assumption of reciprocity between the uplink channel and the downlink channel). In some aspects, the base station may use the estimate of the downlink channel to determine subcarriers to which tone reservation is to be applied.

The base station may determine that tone reservation is to be applied to one or more subcarriers for downlink transmissions to the UE (e.g., based at least in part on an SINR reported by the UE, the uplink channel estimate, other metrics associated with the uplink channel or the downlink channel, network traffic, and/or an amount of data buffered for transmission to the UE). When the base station determines that tone reservation is to be applied, the base station may then determine which subcarriers are to be selected for tone reservation. In some aspects, selection of subcarriers may be based at least in part on a default number, such as the lowest 10% of subcarriers. In some aspects, selection of the default number may be based at least in part on the SINR measurements.

As shown by reference number 610, in some aspects, the base station may iteratively perform subcarrier selection techniques until a threshold PAPR value is reached. For example, the base station may use the UE downlink channel estimate, a default number of tones (e.g., subcarriers), and a default PAPR threshold to perform a selective mapping (SLM) technique, where alternative transmit sequence vectors (e.g., corresponding to the UE downlink channel) are generated from the same data source by multiplying the vectors by a random or pseudo-random phase. After multiplication, IFFT may be performed on the vectors to convert the corresponding signal from the frequency domain to the time domain, and PAPR values may be determined for each of the vectors. The PAPR values may be compared to one another in a manner designed to optimize tone reservation values by identifying a vector having tone reservations that result in a relatively low, or lowest, PAPR value with respect to other vectors. The base station may then determine whether the PAPR threshold is satisfied by the tone reservations indicated in the identified vector.

In some aspects, the subcarrier selection process may be performed up to k iterations, where k is a positive integer, and/or until a PAPR value that satisfies the threshold is reached. For example, if a default value (e.g., an initial value) for the number of subcarriers to which tone reservation is to be applied is 5%, and the subcarrier selection output fails to satisfy the PAPR threshold by applying tone reservation to the lowest 5% of subcarriers, the base station may increase the default value (e.g., by a fixed amount, variable amount, or fixed rate) and perform SLM again to determine if reserving the increased number of subcarriers (e.g., the lowest 6%) will satisfy the PAPR threshold. In some aspects, the PAPR threshold may be modified (e.g., lowered to decrease the number of subcarriers that would be reserved, or raised to increase the number of subcarriers that would be reserved) when iterating through the subcarrier selection process.

Once a tone reservation satisfying the PAPR threshold is identified, the base station may use the identified tone reservation and modulated data to remap the modulated data using the identified tone reservation scheme (e.g., application of tone reservation on the identified subchannels). For example, in a situation where the subcarrier selection process indicates that the lowest 6% of subcarriers (e.g., in terms of SINR) should be reserved to meet a given PAPR threshold, the modulated data may only be mapped to the top 94% subcarriers (e.g., based on received energy and/or power), leaving the bottom 6% reserved. After application of IFFT, the resulting downlink communication may be transmitted to the UE.

The UE may receive the downlink communication as RF signals and may use analog to digital conversion (ADC), using a configured number of bits, to provide digital output to a digital front end (DFE) of the UE. The UE may then apply a fast Fourier transform (FFT) algorithm to convert the received signals to a frequency domain and obtain the UE downlink communication.

The UE may decode a report of the tone reservation (e.g., included in DCI), which may indicate a number of subcarriers to which tone reservation was applied. For example, the report may indicate that tone reservation is to be applied to the lowest 6% of subcarriers.

The UE may use the downlink communication (e.g., data symbols and/or DMRSs) to estimate the energy (e.g., power) of the subcarriers of the channel (e.g., using SINR). After identifying the smallest (e.g., lowest) energy subcarriers (e.g., the bottom 6%), the UE may generate a set of estimated indices associated with a hypothesis of the one or more subcarriers.

As indicated above, FIG. 6 is provided as an example. Other examples may differ from what is described with respect to FIG. 6.

FIG. 7 is a diagram illustrating an example 700 associated with joint rate matching and puncturing for channel oriented tone reservation, in accordance with the present disclosure. As shown in FIG. 7, a base station (e.g., base station 110) may communicate with a UE (e.g., UE 120) using a communication channel that is received with different channel powers at various subcarrier indices. In some aspects, the base station and the UE may be part of a wireless network (e.g., wireless network 100).

Reference number 705 illustrates an estimated channel response to a communication as observed by a receiving device. As shown, the estimated channel response indicates multiple subcarrier indices on which tone reservation may be applied to improve PAPR of the communication before transmitting the communication A transmitting device may determine to apply tone reservation on the indicated tone reservation locations (e.g., TR subcarriers) of the channel.

Reference number 710 illustrates an example of a channel response to a communication having joint rate matching and puncturing applied. In some aspects, the receiving device may determine that a first set of TR subcarriers have rate matching applied based at least in part on the first set of TR subcarriers having energies, as observed by the receiving device, that fail to satisfy (e.g., are at or below) a threshold (e.g., a puncturing/rate matching boundary). In some aspects, the receiving device may determine that a second set of TR subcarriers have puncturing applied based at least in part on the second set of TR subcarriers having energies, as observed by the receiving device, that satisfy (e.g., are at or above) the threshold. The receiving device may discard subcarriers (e.g., sampling from the subcarriers) that are within the first set of TR subcarriers and may zero out subcarriers that are within the second set of TR subcarriers.

As indicated above, FIG. 7 is provided as an example. Other examples may differ from what is described with respect to FIG. 7.

Figure 8:
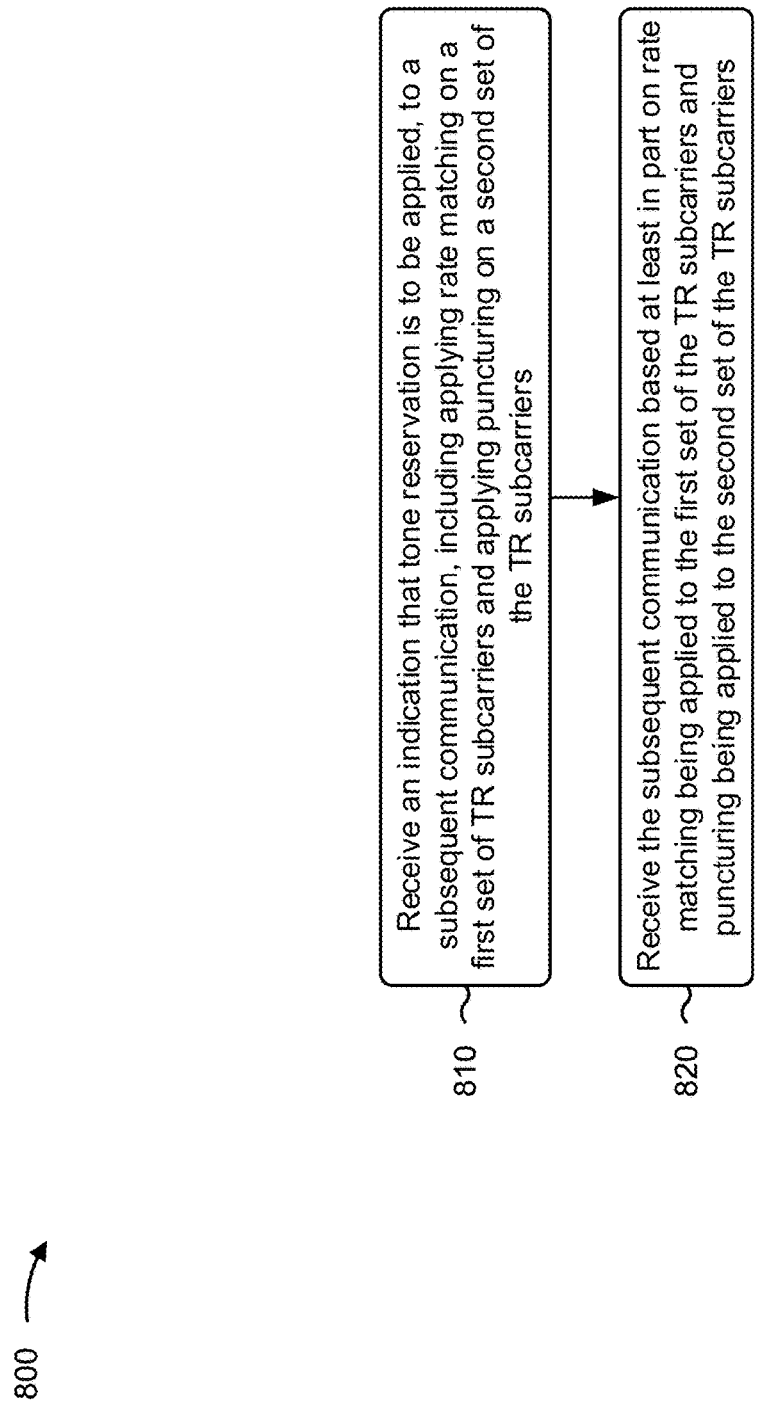
FIGS. 8-11 are diagrams illustrating example processes associated with joint rate matching and puncturing for channel oriented tone reservation, in accordance with the present disclosure.

FIG. 8 is a diagram illustrating an example process 800 performed, for example, by a UE, in accordance with the present disclosure. Example process 800 is an example where the UE (e.g., UE 120) performs operations associated with joint rate matching and puncturing for channel oriented tone reservation.

As shown in FIG. 8, in some aspects, process 800 may include receiving an indication that tone reservation is to be applied, to a subsequent communication, including applying rate matching on a first set of TR subcarriers and applying puncturing on a second set of the TR subcarriers (block 810). For example, the UE (e.g., using communication manager 140 and/or reception component 1202, depicted in FIG. 12) may receive an indication that tone reservation is to be applied, to a subsequent communication, including applying rate matching on a first set of TR subcarriers and applying puncturing on a second set of the TR subcarriers, as described above.

As further shown in FIG. 8, in some aspects, process 800 may include receiving the subsequent communication based at least in part on rate matching being applied to the first set of the TR subcarriers and puncturing being applied to the second set of the TR subcarriers (block 820). For example, the UE (e.g., using communication manager 140 and/or reception component 1202, depicted in FIG. 12) may receive the subsequent communication based at least in part on rate matching being applied to the first set of the TR subcarriers and puncturing being applied to the second set of the TR subcarriers, as described above.

Process 800 may include additional aspects, such as any single aspect or any combination of aspects described below and/or in connection with one or more other processes described elsewhere herein.

In a first aspect, process 800 includes receiving an indication of one or more of a number of subcarriers to which tone reservation is to be applied, a fraction of subcarriers to which tone reservation is to be applied, or a threshold energy for subcarriers to which tone reservation is to be applied.

In a second aspect, alone or in combination with the first aspect, process 800 includes receiving an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

In a third aspect, alone or in combination with one or more of the first and second aspects, the threshold energy is based at least in part on an energy relative to an average channel energy.

In a fourth aspect, alone or in combination with one or more of the first through third aspects, process 800 includes determining a channel response of the subsequent communication, including received energy on subcarriers of the subsequent communication, estimating the TR subcarriers having tone reservation applied based at least in part on received energy on the TR subcarriers, and estimating the first set of the TR subcarriers and the second set of the TR subcarriers based at least in part on received energy on the TR subcarriers.

In a fifth aspect, alone or in combination with one or more of the first through fourth aspects, determining the channel response of the subsequent communication comprises determining the channel response of the subsequent communication based at least in part on one or more of reference signals of the subsequent communication, or data symbols of the subsequent communication.

In a sixth aspect, alone or in combination with one or more of the first through fifth aspects, process 800 includes discarding samplings received via the first set of the TR subcarriers, and zeroing samplings received via the second set of the TR subcarriers.

In a seventh aspect, alone or in combination with one or more of the first through sixth aspects, process 800 includes decoding the subsequent communication based at least in part on discarding the samplings received via the first set of the TR subcarriers and zeroing samplings received via the second set of the TR subcarriers.

In an eighth aspect, alone or in combination with one or more of the first through seventh aspects, the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
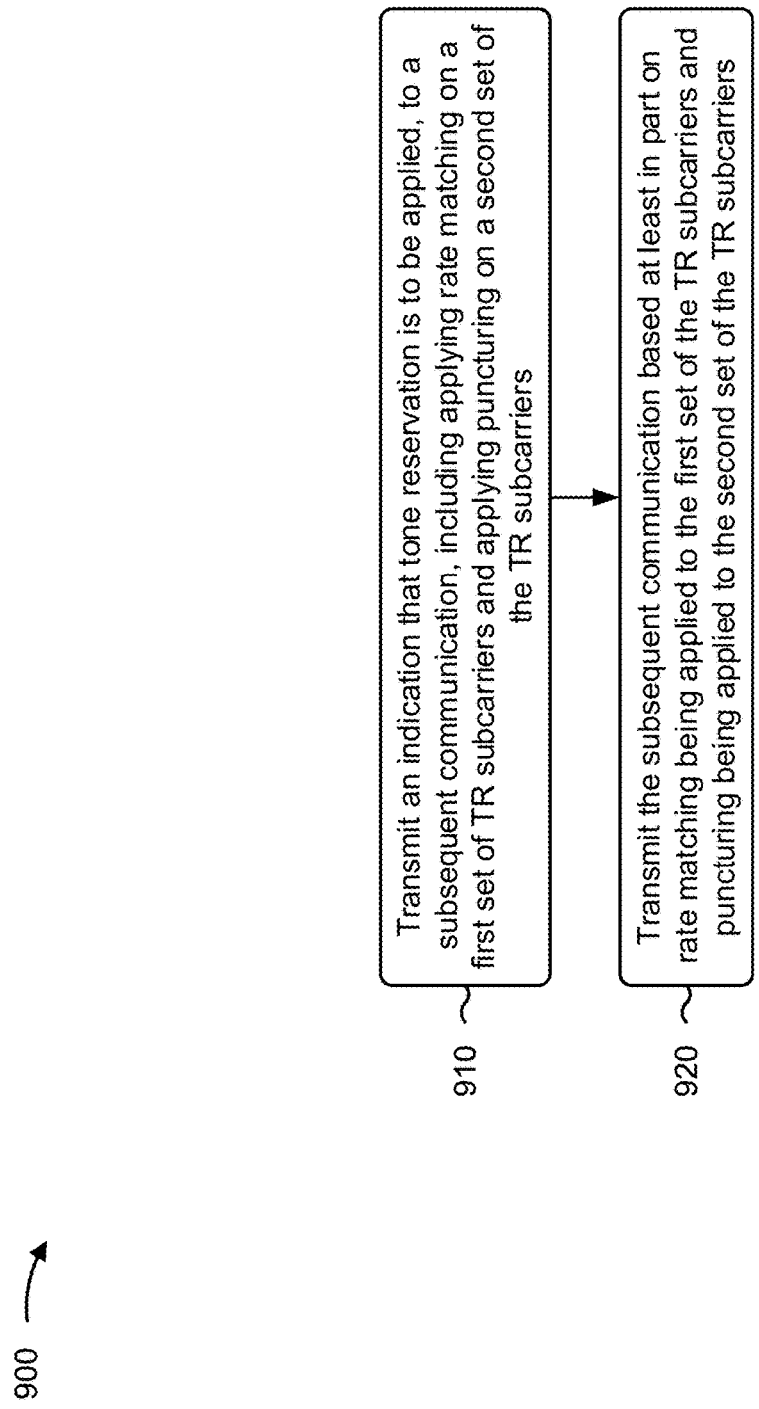

FIG. 9 is a diagram illustrating an example process 900 performed, for example, by a base station, in accordance with the present disclosure. Example process 900 is an example where the base station (e.g., base station 110) performs operations associated with joint rate matching and puncturing for channel oriented tone reservation.

As shown in FIG. 9, in some aspects, process 900 may include transmitting an indication that tone reservation is to be applied, to a subsequent communication, including applying rate matching on a first set of TR subcarriers and applying puncturing on a second set of the TR subcarriers (block 910). For example, the base station (e.g., using communication manager 150 and/or transmission component 1304, depicted in FIG. 13) may transmit an indication that tone reservation is to be applied, to a subsequent communication, including applying rate matching on a first set of TR subcarriers and applying puncturing on a second set of the TR subcarriers, as described above.

As further shown in FIG. 9, in some aspects, process 900 may include transmitting the subsequent communication based at least in part on rate matching being applied to the first set of the TR subcarriers and puncturing being applied to the second set of the TR subcarriers (block 920). For example, the base station (e.g., using communication manager 150 and/or transmission component 1304, depicted in FIG. 13) may transmit the subsequent communication based at least in part on rate matching being applied to the first set of the TR subcarriers and puncturing being applied to the second set of the TR subcarriers, as described above.

Process 900 may include additional aspects, such as any single aspect or any combination of aspects described below and/or in connection with one or more other processes described elsewhere herein.

In a first aspect, process 900 includes transmitting an indication of one or more of a number of subcarriers to which tone reservation is to be applied, a fraction of subcarriers to which tone reservation is to be applied, or a threshold energy for subcarriers to which tone reservation is to be applied.

In a second aspect, alone or in combination with the first aspect, process 900 includes transmitting an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

In a third aspect, alone or in combination with one or more of the first and second aspects, the threshold energy is based at least in part on an energy relative to an average channel energy.

In a fourth aspect, alone or in combination with one or more of the first through third aspects, process 900 includes applying rate matching on the first set of the TR subcarriers and applying puncturing on the second set of the TR subcarriers based at least in part on one or more of measurements of one or more uplink signals received from a user equipment, or a measurement report indicating a channel response of a downlink channel.

In a fifth aspect, alone or in combination with one or more of the first through fourth aspects, the TR subcarriers comprise one or more sets of consecutive subcarriers over one or more frequency ranges, and wherein the second set of the TR subcarriers comprises subcarriers on ends of the one or more frequency ranges.

In a sixth aspect, alone or in combination with one or more of the first through fifth aspects, subcarriers of the first set of the TR subcarriers are estimated to be received by a user equipment with energies within a first range of energies, wherein subcarriers of the second set of the TR subcarriers are estimated to be received by the user equipment with energies within a second range of energies, wherein the second range of energies is higher than the first range of energies.

In a seventh aspect, alone or in combination with one or more of the first through sixth aspects, the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

In an eighth aspect, alone or in combination with one or more of the first through seventh aspects, process 900 includes applying rate matching on the first set of the TR subcarriers and applying puncturing on the second set of the TR subcarriers based at least in part on one or more of an estimated channel response of a downlink channel, a likelihood of a user equipment to identify the first set of the TR subcarriers, or a likelihood of the user equipment identify a data subcarrier as having rate matching applied.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
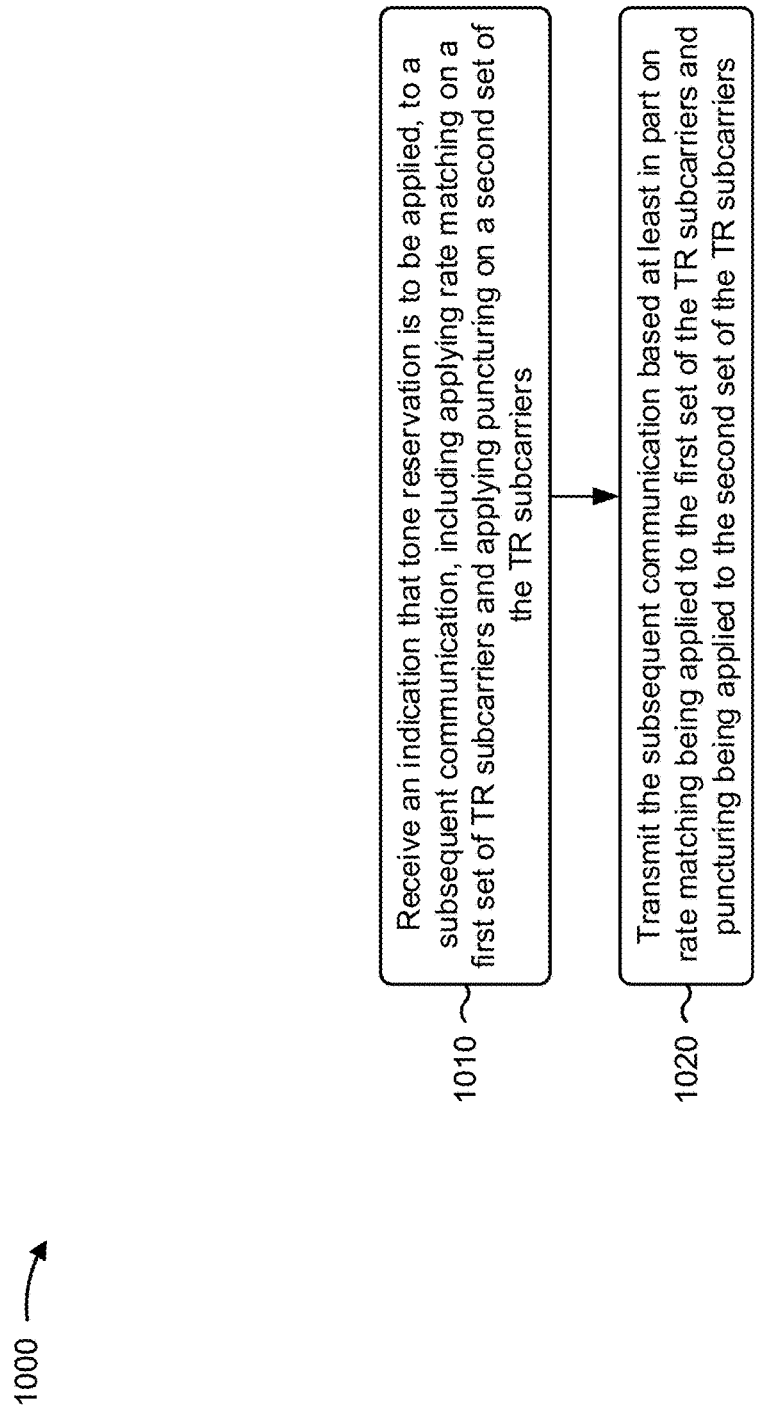

FIG. 10 is a diagram illustrating an example process 1000 performed, for example, by a UE, in accordance with the present disclosure. Example process 1000 is an example where the UE (e.g., UE 120) performs operations associated with joint rate matching and puncturing for channel oriented tone reservation.

As shown in FIG. 10, in some aspects, process 1000 may include receiving an indication that tone reservation is to be applied, to a subsequent communication, including applying rate matching on a first set of TR subcarriers and applying puncturing on a second set of the TR subcarriers (block 1010). For example, the UE (e.g., using communication manager 140 and/or reception component 1202, depicted in FIG. 12) may receive an indication that tone reservation is to be applied, to a subsequent communication, including applying rate matching on a first set of TR subcarriers and applying puncturing on a second set of the TR subcarriers, as described above.

As further shown in FIG. 10, in some aspects, process 1000 may include transmitting the subsequent communication based at least in part on rate matching being applied to the first set of the TR subcarriers and puncturing being applied to the second set of the TR subcarriers (block 1020). For example, the UE (e.g., using communication manager 140 and/or transmission component 1204, depicted in FIG. 12) may transmit the subsequent communication based at least in part on rate matching being applied to the first set of the TR subcarriers and puncturing being applied to the second set of the TR subcarriers, as described above.

Process 1000 may include additional aspects, such as any single aspect or any combination of aspects described below and/or in connection with one or more other processes described elsewhere herein.

In a first aspect, process 1000 includes receiving an indication of one or more of a number of subcarriers to which tone reservation is to be applied, a fraction of subcarriers to which tone reservation is to be applied, or a threshold energy for subcarriers to which tone reservation is to be applied.

In a second aspect, alone or in combination with the first aspect, process 1000 includes receiving an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

In a third aspect, alone or in combination with one or more of the first and second aspects, the threshold energy is based at least in part on an energy relative to an average channel energy.

In a fourth aspect, alone or in combination with one or more of the first through third aspects, process 1000 includes applying rate matching on the first set of the TR subcarriers and applying puncturing on the second set of the TR subcarriers based at least in part on one or more of measurements of one or more downlink signals received from a base station, or a measurement report indicating a channel response of an uplink channel.

In a fifth aspect, alone or in combination with one or more of the first through fourth aspects, the TR subcarriers comprise one or more sets of consecutive subcarriers over one or more frequency ranges, and wherein the second set of the TR subcarriers comprises subcarriers on ends of the one or more frequency ranges.

In a sixth aspect, alone or in combination with one or more of the first through fifth aspects, subcarriers of the first set of the TR subcarriers are estimated to be received by a base station with energies within a first range of energies, wherein subcarriers of the second set of the TR subcarriers are estimated to be received by the base station with energies within a second range of energies, wherein the second range of energies is higher than the first range of energies.

In a seventh aspect, alone or in combination with one or more of the first through sixth aspects, the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
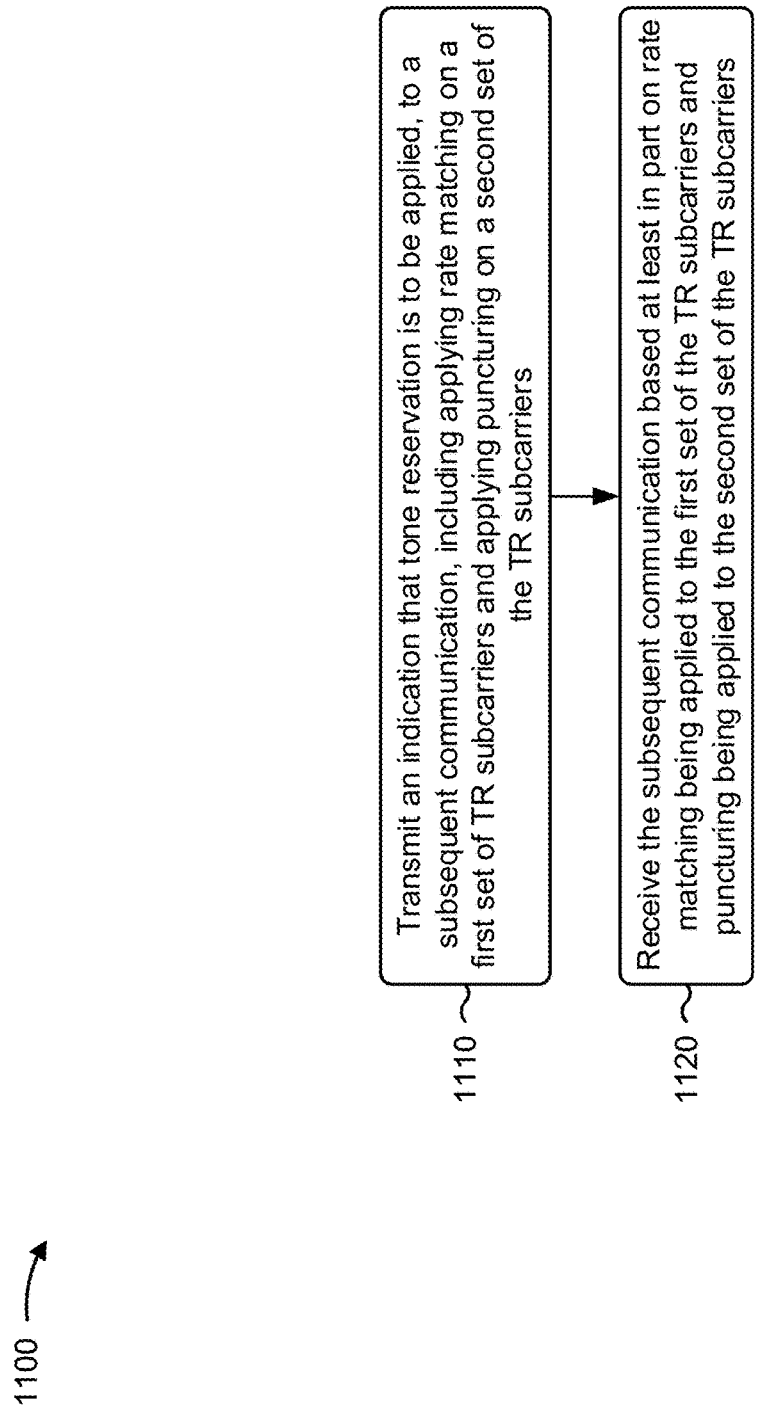

FIG. 11 is a diagram illustrating an example process 1100 performed, for example, by a base station, in accordance with the present disclosure. Example process 1100 is an example where the base station (e.g., base station 110) performs operations associated with joint rate matching and puncturing for channel oriented tone reservation.

As shown in FIG. 11, in some aspects, process 1100 may include transmitting an indication that tone reservation is to be applied, to a subsequent communication, including applying rate matching on a first set of TR subcarriers and applying puncturing on a second set of the TR subcarriers (block 1110). For example, the base station (e.g., using communication manager 150 and/or transmission component 1304, depicted in FIG. 13) may transmit an indication that tone reservation is to be applied, to a subsequent communication, including applying rate matching on a first set of TR subcarriers and applying puncturing on a second set of the TR subcarriers, as described above.

As further shown in FIG. 11, in some aspects, process 1100 may include receiving the subsequent communication based at least in part on rate matching being applied to the first set of the TR subcarriers and puncturing being applied to the second set of the TR subcarriers (block 1120). For example, the base station (e.g., using communication manager 150 and/or reception component 1302, depicted in FIG. 13) may receive the subsequent communication based at least in part on rate matching being applied to the first set of the TR subcarriers and puncturing being applied to the second set of the TR subcarriers, as described above.

Process 1100 may include additional aspects, such as any single aspect or any combination of aspects described below and/or in connection with one or more other processes described elsewhere herein.

In a first aspect, process 1100 includes transmitting an indication of one or more of a number of subcarriers to which tone reservation is to be applied, a fraction of subcarriers to which tone reservation is to be applied, or a threshold energy for subcarriers to which tone reservation is to be applied.

In a second aspect, alone or in combination with the first aspect, process 1100 includes transmitting an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

In a third aspect, alone or in combination with one or more of the first and second aspects, the threshold energy is based at least in part on an energy relative to an average channel energy.

In a fourth aspect, alone or in combination with one or more of the first through third aspects, process 1100 includes determining a channel response of the subsequent communication, including received energy on subcarriers of the subsequent communication, estimating the TR subcarriers having tone reservation applied based at least in part on received energy on the TR subcarriers, and estimating the first set of the TR subcarriers and the second set of the TR subcarriers based at least in part on received energy on the TR subcarriers.

In a fifth aspect, alone or in combination with one or more of the first through fourth aspects, determining the channel response of the subsequent communication comprises determining the channel response of the subsequent communication based at least in part on one or more of reference signals of the subsequent communication, or data symbols of the subsequent communication.

In a sixth aspect, alone or in combination with one or more of the first through fifth aspects, process 1100 includes discarding samplings received via the first set of the TR subcarriers, and zeroing samplings received via the second set of the TR subcarriers.

In a seventh aspect, alone or in combination with one or more of the first through sixth aspects, process 1100 includes decoding the subsequent communication based at least in part on discarding the samplings received via the first set of the TR subcarriers and zeroing samplings received via the second set of the TR subcarriers.

In an eighth aspect, alone or in combination with one or more of the first through seventh aspects, the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
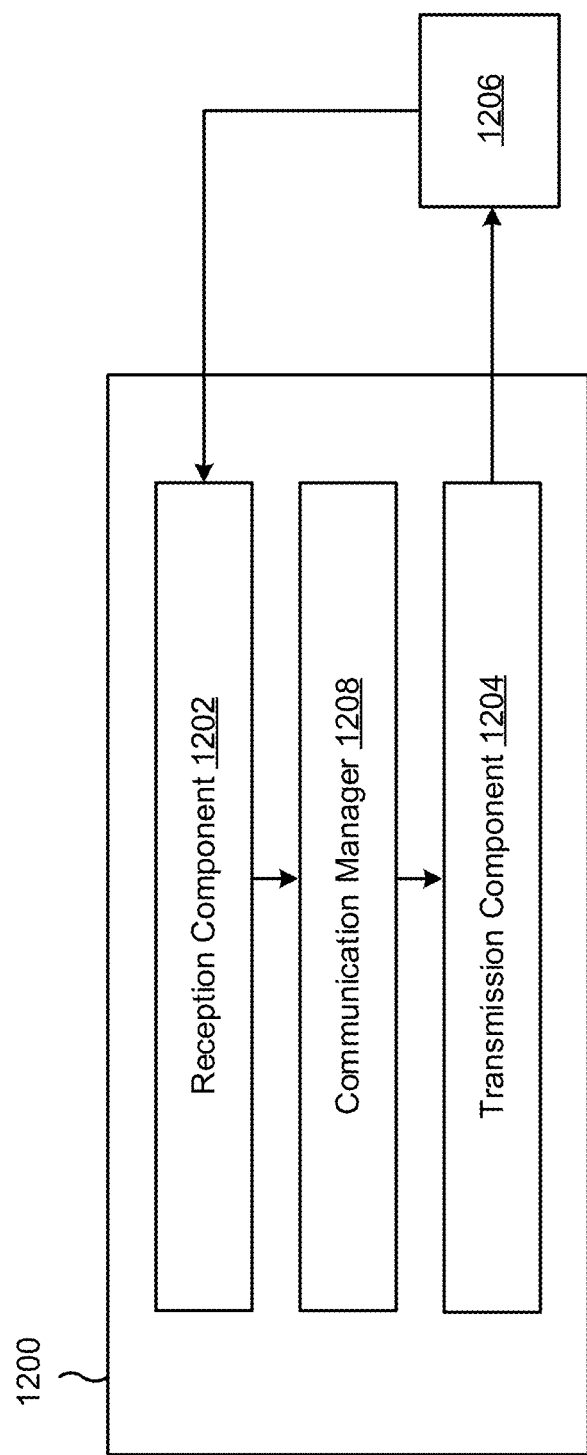
FIGS. 12 and 13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 140).

In some aspects, the apparatus 1200 may be configured to perform one or more operations described herein in connection with FIGS. 4-7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive an indication that tone reservation is to be applied, to a subsequent communication, including applying rate matching on a first set of TR subcarriers and applying puncturing on a second set of the TR subcarriers. The reception component 1202 may receive the subsequent communication based at least in part on rate matching being applied to the first set of the TR subcarriers and puncturing being applied to the second set of the TR subcarriers.

The reception component 1202 may receive an indication of one or more of a number of subcarriers to which tone reservation is to be applied, a fraction of subcarriers to which tone reservation is to be applied, or a threshold energy for subcarriers to which tone reservation is to be applied.

The reception component 1202 may receive an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

The communication manager 1208 may determine a channel response of the subsequent communication, including received energy on subcarriers of the subsequent communication.

The communication manager 1208 may estimate the TR subcarriers having tone reservation applied based at least in part on received energy on the TR subcarriers.

The communication manager 1208 may estimate the first set of the TR subcarriers and the second set of the TR subcarriers based at least in part on received energy on the TR subcarriers.

The communication manager 1208 may discard samplings received via the first set of the TR subcarriers.

The communication manager 1208 may zero samplings received via the second set of the TR subcarriers.

The communication manager 1208 may decode the subsequent communication based at least in part on discarding the samplings received via the first set of the TR subcarriers and zeroing samplings received via the second set of the TR subcarriers.

The reception component 1202 may receive an indication that tone reservation is to be applied, to a subsequent communication, including applying rate matching on a first set of TR subcarriers and applying puncturing on a second set of the TR subcarriers. The transmission component 1204 may transmit the subsequent communication based at least in part on rate matching being applied to the first set of the TR subcarriers and puncturing being applied to the second set of the TR subcarriers.

The reception component 1202 may receive an indication of one or more of a number of subcarriers to which tone reservation is to be applied, a fraction of subcarriers to which tone reservation is to be applied, or a threshold energy for subcarriers to which tone reservation is to be applied.

The reception component 1202 may receive an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

The communication manager 1208 may apply rate matching on the first set of the TR subcarriers and applying puncturing on the second set of the TR subcarriers based at least in part on one or more measurements of one or more downlink signals received from a base station, or a measurement report indicating a channel response of an uplink channel.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
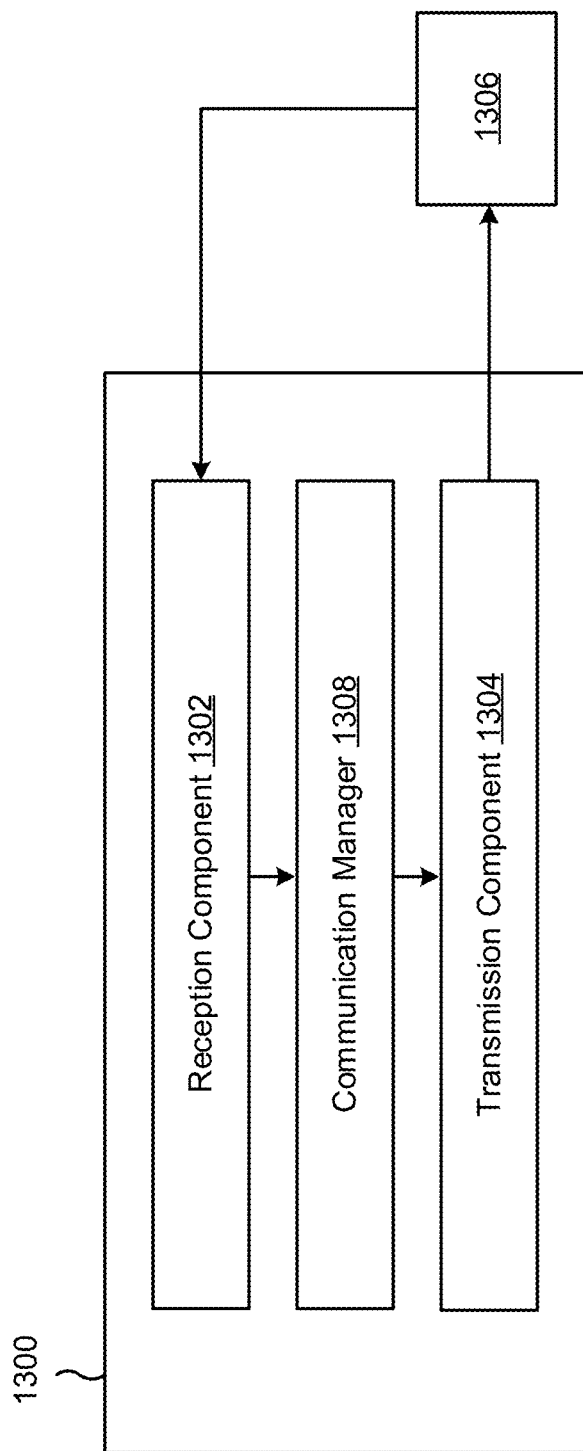

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308 (e.g., the communication manager 150).

In some aspects, the apparatus 1300 may be configured to perform one or more operations described herein in connection with FIGS. 4-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit an indication that tone reservation is to be applied, to a subsequent communication, including applying rate matching on a first set of TR subcarriers and applying puncturing on a second set of the TR subcarriers. The transmission component 1304 may transmit the subsequent communication based at least in part on rate matching being applied to the first set of the TR subcarriers and puncturing being applied to the second set of the TR subcarriers.

The transmission component 1304 may transmit an indication of one or more of a number of subcarriers to which tone reservation is to be applied, a fraction of subcarriers to which tone reservation is to be applied, or a threshold energy for subcarriers to which tone reservation is to be applied.

The transmission component 1304 may transmit an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

The communication manager 1308 may apply rate matching on the first set of the TR subcarriers and applying puncturing on the second set of the TR subcarriers based at least in part on one or more of measurements of one or more uplink signals received from a user equipment, or a measurement report indicating a channel response of a downlink channel.

The communication manager 1308 may apply rate matching on the first set of the TR subcarriers and applying puncturing on the second set of the TR subcarriers based at least in part on one or more of an estimated channel response of a downlink channel, a likelihood of a user equipment to identify the first set of the TR subcarriers, or a likelihood of the user equipment identify a data subcarrier as having rate matching applied.

The transmission component 1304 may transmit an indication that tone reservation is to be applied, to a subsequent communication, including applying rate matching on a first set of TR subcarriers and applying puncturing on a second set of the TR subcarriers. The reception component 1302 may receive the subsequent communication based at least in part on rate matching being applied to the first set of the TR subcarriers and puncturing being applied to the second set of the TR subcarriers.

The transmission component 1304 may transmit an indication of one or more of a number of subcarriers to which tone reservation is to be applied, a fraction of subcarriers to which tone reservation is to be applied, or a threshold energy for subcarriers to which tone reservation is to be applied.

The transmission component 1304 may transmit an indication of a number of the TR subcarriers within the first set of the TR subcarriers based at least in part on one or more of an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

The communication manager 1308 may determine a channel response of the subsequent communication, including received energy on subcarriers of the subsequent communication.

The communication manager 1308 may estimate the TR subcarriers having tone reservation applied based at least in part on received energy on the TR subcarriers.

The communication manager 1308 may estimate the first set of the TR subcarriers and the second set of the TR subcarriers based at least in part on received energy on the TR subcarriers.

The communication manager 1308 may discard samplings received via the first set of the TR subcarriers.

The communication manager 1308 may zero samplings received via the second set of the TR subcarriers.

The communication manager 1308 may decode the subsequent communication based at least in part on discarding the samplings received via the first set of the TR subcarriers and zeroing samplings received via the second set of the TR subcarriers.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving an indication that tone reservation is to be applied, to a subsequent communication, including applying rate matching on a first set of tone reservation (TR) subcarriers and applying puncturing on a second set of the TR subcarriers; and receiving the subsequent communication based at least in part on rate matching being applied to the first set of the TR subcarriers and puncturing being applied to the second set of the TR subcarriers.

Aspect 2: The method of Aspect 1, further comprising: receiving an indication of one or more of: a number of subcarriers to which tone reservation is to be applied, a fraction of subcarriers to which tone reservation is to be applied, or a threshold energy for subcarriers to which tone reservation is to be applied.

Aspect 3: The method of any of Aspects 1-2, further comprising: receiving an indication of a number of the TR subcarriers within the first set of the TR subcarriers based at least in part on one or more of: an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

Aspect 4: The method of Aspect 3, wherein the threshold energy is based at least in part on an energy relative to an average channel energy.

Aspect 5: The method of any of Aspects 1-4, further comprising: determining a channel response of the subsequent communication, including received energy on subcarriers of the subsequent communication; estimating the TR subcarriers having tone reservation applied based at least in part on received energy on the TR subcarriers; and estimating the first set of the TR subcarriers and the second set of the TR subcarriers based at least in part on received energy on the TR subcarriers.

Aspect 6: The method of Aspect 5, wherein determining the channel response of the subsequent communication comprises determining the channel response of the subsequent communication based at least in part on one or more of: demodulation reference signals of the subsequent communication, or data symbols of the subsequent communication.

Aspect 7: The method of any of Aspects 1-6, further comprising: discarding samplings received via the first set of the TR subcarriers; and zeroing samplings received via the second set of the TR subcarriers.

Aspect 8: The method of Aspect 7, further comprising: decoding the subsequent communication based at least in part on discarding the samplings received via the first set of the TR subcarriers and zeroing samplings received via the second set of the TR subcarriers.

Aspect 9: The method of any of Aspects 1-8, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Aspect 10: A method of wireless communication performed by a base station, comprising: transmitting an indication that tone reservation is to be applied, to a subsequent communication, including applying rate matching on a first set of tone reservation (TR) subcarriers and applying puncturing on a second set of the TR subcarriers; and transmitting the subsequent communication based at least in part on rate matching being applied to the first set of the TR subcarriers and puncturing being applied to the second set of the TR subcarriers.

Aspect 11: The method of Aspect 10, further comprising: transmitting an indication of one or more of: a number of subcarriers to which tone reservation is to be applied, a fraction of subcarriers to which tone reservation is to be applied, or a threshold energy for subcarriers to which tone reservation is to be applied.

Aspect 12: The method of any of Aspects 10-11, further comprising: transmitting an indication of a number of the TR subcarriers within the first set of the TR subcarriers based at least in part on one or more of: an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

Aspect 13: The method of Aspect 12, wherein the threshold energy is based at least in part on an energy relative to an average channel energy.

Aspect 14: The method of any of Aspects 10-13, further comprising: applying rate matching on the first set of the TR subcarriers and applying puncturing on the second set of the TR subcarriers based at least in part on one or more of: measurements of one or more uplink signals received from a user equipment, or a measurement report indicating a channel response of a downlink channel.

Aspect 15: The method of any of Aspects 10-14, wherein the TR subcarriers comprise one or more sets of consecutive subcarriers over one or more frequency ranges, and wherein the second set of the TR subcarriers comprises subcarriers on ends of the one or more frequency ranges.

Aspect 16: The method of any of Aspects 10-15, wherein subcarriers of the first set of the TR subcarriers are estimated to be received by a user equipment with energies within a first range of energies, wherein subcarriers of the second set of the TR subcarriers are estimated to be received by the user equipment with energies within a second range of energies, wherein the second range of energies is higher than the first range of energies.

Aspect 17: The method of any of Aspects 10-16, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Aspect 18: The method of any of Aspects 10-17, further comprising: applying rate matching on the first set of the TR subcarriers and applying puncturing on the second set of the TR subcarriers based at least in part on one or more of: an estimated channel response of a downlink channel, a likelihood of a user equipment to identify the first set of the TR subcarriers, or a likelihood of the user equipment identify a data subcarrier as having rate matching applied.

Aspect 19: A method of wireless communication performed by a user equipment (UE), comprising: receiving an indication that tone reservation is to be applied, to a subsequent communication, including applying rate matching on a first set of tone reservation (TR) subcarriers and applying puncturing on a second set of the TR subcarriers; and transmitting the subsequent communication based at least in part on rate matching being applied to the first set of the TR subcarriers and puncturing being applied to the second set of the TR subcarriers.

Aspect 20: The method of Aspect 19, further comprising: receiving an indication of one or more of: a number of subcarriers to which tone reservation is to be applied, a fraction of subcarriers to which tone reservation is to be applied, or a threshold energy for subcarriers to which tone reservation is to be applied.

Aspect 21: The method of any of Aspects 19-20, further comprising: receiving an indication of a number of the TR subcarriers within the first set of the TR subcarriers based at least in part on one or more of: an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

Aspect 22: The method of Aspect 21, wherein the threshold energy is based at least in part on an energy relative to an average channel energy.

Aspect 23: The method of any of Aspects 19-22, further comprising: applying rate matching on the first set of the TR subcarriers and applying puncturing on the second set of the TR subcarriers based at least in part on one or more of: measurements of one or more downlink signals received from a base station, or a measurement report indicating a channel response of an uplink channel.

Aspect 24: The method of any of Aspects 19-23, wherein the TR subcarriers comprise one or more sets of consecutive sub carriers over one or more frequency ranges, and wherein the second set of the TR subcarriers comprises subcarriers on ends of the one or more frequency ranges.

Aspect 25: The method of any of Aspects 19-24, wherein subcarriers of the first set of the TR subcarriers are estimated to be received by a base station with energies within a first range of energies, wherein subcarriers of the second set of the TR subcarriers are estimated to be received by the base station with energies within a second range of energies, wherein the second range of energies is higher than the first range of energies.

Aspect 26: The method of any of Aspects 19-25, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Aspect 27: A method of wireless communication performed by a base station, comprising: transmitting an indication that tone reservation is to be applied, to a subsequent communication, including applying rate matching on a first set of tone reservation (TR) subcarriers and applying puncturing on a second set of the TR subcarriers; and receiving the subsequent communication based at least in part on rate matching being applied to the first set of the TR subcarriers and puncturing being applied to the second set of the TR subcarriers.

Aspect 28: The method of Aspect 27, further comprising: transmitting an indication of one or more of: a number of subcarriers to which tone reservation is to be applied, a fraction of subcarriers to which tone reservation is to be applied, or a threshold energy for subcarriers to which tone reservation is to be applied.

Aspect 29: The method of any of Aspects 27-28, further comprising: transmitting an indication of a number of the TR subcarriers within the first set of the TR subcarriers based at least in part on one or more of: an explicit indication of the number of the TR subcarriers within the first set of the TR subcarriers, an indication of a fraction of subcarriers of the subsequent communication that are within the first set of the TR subcarriers, an indication of a fraction of the TR subcarriers that are within the first set of the TR subcarriers, or a threshold energy for TR subcarriers to be within the first set of the TR subcarriers.

Aspect 30: The method of any of Aspects 27-29, wherein the threshold energy is based at least in part on an energy relative to an average channel energy.

Aspect 31: The method of any of Aspects 27-30, further comprising: determining a channel response of the subsequent communication, including received energy on subcarriers of the subsequent communication; estimating the TR subcarriers having tone reservation applied based at least in part on received energy on the TR subcarriers; and estimating the first set of the TR subcarriers and the second set of the TR subcarriers based at least in part on received energy on the TR subcarriers.

Aspect 32: The method of any of Aspects 27-31, wherein determining the channel response of the subsequent communication comprises determining the channel response of the subsequent communication based at least in part on one or more of: demodulation reference signals of the subsequent communication, or data symbols of the subsequent communication.

Aspect 33: The method of any of Aspects 27-32, further comprising: discarding samplings received via the first set of the TR subcarriers; and zeroing samplings received via the second set of the TR subcarriers.

Aspect 34: The method of Aspect 33, further comprising: decoding the subsequent communication based at least in part on discarding the samplings received via the first set of the TR subcarriers and zeroing samplings received via the second set of the TR subcarriers.

Aspect 35: The method of any of Aspects 27-34, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive an indication that tone reservation is to be applied, to a subsequent communication, including applying rate matching on a first set of tone reservation (TR) subcarriers and applying puncturing on a second set of the TR subcarriers; and
      receive the subsequent communication based at least in part on rate matching being applied to the first set of the TR subcarriers and puncturing being applied to the second set of the TR subcarriers.

2. The UE of claim 1, wherein the one or more processors are further configured to:
   receive an indication of one or more of:
      a number of subcarriers to which tone reservation is to be applied,
      a fraction of subcarriers to which tone reservation is to be applied, or
      a threshold energy for subcarriers to which tone reservation is to be applied.

3. The UE of claim 1, wherein the one or more processors are further configured to:
   receive an indication of a number of the TR subcarriers within the first set of the TR subcarriers based at least in part on one or more of:
      an explicit indication of the number of the TR subcarriers within the first set of the TR subcarriers,
      an indication of a fraction of subcarriers of the subsequent communication that are within the first set of the TR subcarriers,
      an indication of a fraction of the TR subcarriers that are within the first set of the TR subcarriers, or
      a threshold energy for TR subcarriers to be within the first set of the TR subcarriers.

4. The UE of claim 3, wherein the threshold energy is based at least in part on an energy relative to an average channel energy.

5. The UE of claim 1, wherein the one or more processors are further configured to:
   determine a channel response of the subsequent communication, including received energy on subcarriers of the subsequent communication;
   estimate the TR subcarriers having tone reservation applied based at least in part on received energy on the TR subcarriers; and
   estimate the first set of the TR subcarriers and the second set of the TR subcarriers based at least in part on received energy on the TR subcarriers.

6. The UE of claim 5, wherein the one or more processors, to determine the channel response of the subsequent communication, are configured to determine the channel response of the subsequent communication based at least in part on one or more of:
   reference signals of the subsequent communication, or
   data symbols of the subsequent communication.

7. The UE of claim 1, wherein the one or more processors are further configured to:
   discard samplings received via the first set of the TR subcarriers; and
   zero samplings received via the second set of the TR subcarriers.

8. The UE of claim 7, wherein the one or more processors are further configured to:
   decode the subsequent communication based at least in part on discarding the samplings received via the first set of the TR subcarriers and zeroing samplings received via the second set of the TR subcarriers.

9. The UE of claim 1, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

10. A UE for wireless communication, comprising:
a memory; and
one or more processors, coupled to the memory, configured to:
receive an indication that tone reservation is to be applied, to a subsequent communication, including applying rate matching on a first set of tone reservation (TR) subcarriers and applying puncturing on a second set of the TR subcarriers; and
transmit the subsequent communication based at least in part on rate matching being applied to the first set of the TR subcarriers and puncturing being applied to the second set of the TR subcarriers.

11. The UE of claim 10, wherein the one or more processors are further configured to:
receive an indication of one or more of:
a number of subcarriers to which tone reservation is to be applied,
a fraction of subcarriers to which tone reservation is to be applied, or
a threshold energy for subcarriers to which tone reservation is to be applied.

12. The UE of claim 10, wherein the one or more processors are further configured to:
receive an indication of a number of the TR subcarriers within the first set of the TR subcarriers based at least in part on one or more of:
an explicit indication of the number of the TR subcarriers within the first set of the TR subcarriers,
an indication of a fraction of subcarriers of the subsequent communication that are within the first set of the TR subcarriers,
an indication of a fraction of the TR subcarriers that are within the first set of the TR subcarriers, or
a threshold energy for TR subcarriers to be within the first set of the TR subcarriers.

13. The UE of claim 12, wherein the threshold energy is based at least in part on an energy relative to an average channel energy.

14. The UE of claim 10, wherein the one or more processors are further configured to:
apply rate matching on the first set of the TR subcarriers and applying puncturing on the second set of the TR subcarriers based at least in part on one or more of:
measurements of one or more downlink signals received from a base station, or
a measurement report indicating a channel response of an uplink channel.

15. The UE of claim 10, wherein the TR subcarriers comprise one or more sets of consecutive subcarriers over one or more frequency ranges, and
wherein the second set of the TR subcarriers comprises subcarriers on ends of the one or more frequency ranges.

16. The UE of claim 10, wherein subcarriers of the first set of the TR subcarriers are estimated to be received by a base station with energies within a first range of energies,
wherein subcarriers of the second set of the TR subcarriers are estimated to be received by the base station with energies within a second range of energies,
wherein the second range of energies is higher than the first range of energies.

17. The UE of claim 10, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

18. A method of wireless communication performed by a user equipment (UE), comprising:
receiving an indication that tone reservation is to be applied, to a subsequent communication, including applying rate matching on a first set of tone reservation (TR) subcarriers and applying puncturing on a second set of the TR subcarriers; and
receiving the subsequent communication based at least in part on rate matching being applied to the first set of the TR subcarriers and puncturing being applied to the second set of the TR subcarriers.

19. The method of claim 18, further comprising:
receiving an indication of one or more of:
a number of subcarriers to which tone reservation is to be applied,
a fraction of subcarriers to which tone reservation is to be applied, or
a threshold energy for subcarriers to which tone reservation is to be applied.

20. The method of claim 18, further comprising:
receiving an indication of a number of the TR subcarriers within the first set of the TR subcarriers based at least in part on one or more of:
an explicit indication of the number of the TR subcarriers within the first set of the TR subcarriers,
an indication of a fraction of subcarriers of the subsequent communication that are within the first set of the TR subcarriers,
an indication of a fraction of the TR subcarriers that are within the first set of the TR subcarriers, or
a threshold energy for TR subcarriers to be within the first set of the TR sub carriers.

21. The method of claim 18, further comprising:
determining a channel response of the subsequent communication, including received energy on subcarriers of the subsequent communication;
estimating the TR subcarriers having tone reservation applied based at least in part on received energy on the TR subcarriers; and
estimating the first set of the TR subcarriers and the second set of the TR subcarriers based at least in part on received energy on the TR subcarriers.

22. The method of claim 18, further comprising:
discarding samplings received via the first set of the TR subcarriers; and
zeroing samplings received via the second set of the TR subcarriers.

23. The method of claim 20, further comprising:
decoding the subsequent communication based at least in part on discarding the samplings received via the first set of the TR subcarriers and zeroing samplings received via the second set of the TR subcarriers.

24. The method of claim 18, wherein the indication that tone reservation is to be applied to the subsequent communication indicates that tone reservation is to be applied to one or more additional subsequent communications, including having rate matching applied on the first set of the TR subcarriers and having puncturing applied to the second set of the TR subcarriers.

25. A method of wireless communication performed by a user equipment (UE), comprising:

receiving an indication that tone reservation is to be applied, to a subsequent communication, including applying rate matching on a first set of tone reservation (TR) subcarriers and applying puncturing on a second set of the TR subcarriers; and transmitting the subsequent communication based at least in part on rate matching being applied to the first set of the TR subcarriers and puncturing being applied to the second set of the TR subcarriers.

26. The method of claim 25, further comprising:
receiving an indication of one or more of:
 a number of subcarriers to which tone reservation is to be applied,
 a fraction of subcarriers to which tone reservation is to be applied, or
 a threshold energy for subcarriers to which tone reservation is to be applied.

27. The method of claim 25, further comprising:
receiving an indication of a number of the TR subcarriers within the first set of the TR subcarriers based at least in part on one or more of:
 an explicit indication of the number of the TR subcarriers within the first set of the TR subcarriers,
 an indication of a fraction of subcarriers of the subsequent communication that are within the first set of the TR subcarriers,
 an indication of a fraction of the TR subcarriers that are within the first set of the TR subcarriers, or
 a threshold energy for TR subcarriers to be within the first set of the TR sub carriers.

28. The method of claim 25, further comprising:
applying rate matching on the first set of the TR subcarriers and applying puncturing on the second set of the TR subcarriers based at least in part on one or more of:
 measurements of one or more downlink signals received from a base station, or
 a measurement report indicating a channel response of an uplink channel.

29. The method of claim 25, wherein the TR subcarriers comprise one or more sets of consecutive subcarriers over one or more frequency ranges, and
 wherein the second set of the TR subcarriers comprises subcarriers on ends of the one or more frequency ranges.

30. The method of claim 25, wherein subcarriers of the first set of the TR subcarriers are estimated to be received by a base station with energies within a first range of energies,
 wherein subcarriers of the second set of the TR subcarriers are estimated to be received by the base station with energies within a second range of energies,
 wherein the second range of energies is higher than the first range of energies.

* * * * *